United States Patent
Liu et al.

(10) Patent No.: US 10,313,692 B2
(45) Date of Patent: Jun. 4, 2019

(54) VISUAL PERCEPTION CHARACTERISTICS-COMBINING HIERARCHICAL VIDEO CODING METHOD

(71) Applicant: BEIJING UNIVERSITY OF TECHNOLOGY, Beijing (CN)

(72) Inventors: Pengyu Liu, Beijing (CN); Kebin Jia, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 118 days.

(21) Appl. No.: 15/124,672

(22) PCT Filed: Dec. 31, 2015

(86) PCT No.: PCT/CN2015/100056
§ 371 (c)(1),
(2) Date: Sep. 8, 2016

(87) PCT Pub. No.: WO2016/115968
PCT Pub. Date: Jul. 28, 2016

(65) Prior Publication Data
US 2017/0085892 A1    Mar. 23, 2017

(30) Foreign Application Priority Data
Jan. 20, 2015    (CN) .......................... 2015 1 0025201

(51) Int. Cl.
*H04N 7/12*    (2006.01)
*H04N 11/02*    (2006.01)
(Continued)

(52) U.S. Cl.
CPC ............. *H04N 19/36* (2014.11); *H04N 19/10* (2014.11); *H04N 19/103* (2014.11);
(Continued)

(58) Field of Classification Search
CPC ...... H04N 19/36; H04N 19/10; H04N 19/154; H04N 19/132; H04N 19/127;
(Continued)

(56) References Cited

U.S. PATENT DOCUMENTS

| | | | |
|---|---|---|---|
| 8,774,272 B1 | 7/2014 | Chen | 375/240.12 |
| 2007/0206674 A1 | 9/2007 | Ziauddin et al. | 375/240.05 |

(Continued)

FOREIGN PATENT DOCUMENTS

| | | |
|---|---|---|
| CN | 101621709 A | 1/2010 |
| CN | 102186070 A | 9/2011 |

(Continued)

OTHER PUBLICATIONS

Liu, Peng-Yu et al., "Video ROI Extraction Algorithm Based on Reconstructed Encoding Information" Computer Engineering; vol. 37; No. 24; Dec. 2011.

(Continued)

*Primary Examiner* — Jorge L Ortiz Criado
*Assistant Examiner* — Susan E. Hodges
(74) *Attorney, Agent, or Firm* — J.C. Patents

(57) ABSTRACT

A visual perception characteristics-combining hierarchical video coding method includes: setting priority of visual interest area and setting allocation scheme of video coding resource. Setting priority of visual interest area includes analyzing both time and space visual characteristic saliency of video content. Setting allocation scheme of video coding resource includes, according to the priority of visual interest area, macroblock coding resource of interest area is satisfied preferentially to realize hierarchical coding.

17 Claims, 6 Drawing Sheets

(51) Int. Cl.

| | | |
|---|---|---|
| *H04B 1/66* | (2006.01) | |
| *H04N 19/176* | (2014.01) | |
| *H04N 19/10* | (2014.01) | |
| *H04N 19/36* | (2014.01) | |
| *H04N 19/11* | (2014.01) | |
| *H04N 19/124* | (2014.01) | |
| *H04N 19/139* | (2014.01) | |
| *H04N 19/147* | (2014.01) | |
| *H04N 19/167* | (2014.01) | |
| *H04N 19/37* | (2014.01) | |
| *H04N 19/103* | (2014.01) | |
| *H04N 19/127* | (2014.01) | |
| *H04N 19/132* | (2014.01) | |
| *H04N 19/154* | (2014.01) | |
| *H04N 19/17* | (2014.01) | |
| *H04N 19/53* | (2014.01) | |

(52) U.S. Cl.
CPC ........... *H04N 19/11* (2014.11); *H04N 19/124* (2014.11); *H04N 19/127* (2014.11); *H04N 19/132* (2014.11); *H04N 19/139* (2014.11); *H04N 19/147* (2014.11); *H04N 19/154* (2014.11); *H04N 19/167* (2014.11); *H04N 19/17* (2014.11); *H04N 19/176* (2014.11); *H04N 19/37* (2014.11); *H04N 19/53* (2014.11)

(58) Field of Classification Search
CPC ...... H04N 19/103; H04N 19/37; H04N 19/53; H04N 19/17; H04N 19/176; H04N 19/147; H04N 19/139; H04N 19/11; H04N 19/167; H04N 19/124
USPC ........................................................ 375/240
See application file for complete search history.

(56) References Cited

U.S. PATENT DOCUMENTS

| | | | |
|---|---|---|---|
| 2008/0219573 A1* | 9/2008 | Lu .......................... | H04N 19/61 382/236 |
| 2009/0279603 A1* | 11/2009 | Chen .................... | H04N 19/159 375/240.02 |
| 2010/0118959 A1* | 5/2010 | Lou ....................... | H04N 19/197 375/240.16 |
| 2016/0173906 A1* | 6/2016 | Lei ....................... | H04N 19/176 375/240.13 |

FOREIGN PATENT DOCUMENTS

| | | |
|---|---|---|
| CN | 103618900 A | 3/2014 |
| CN | 104539962 A | 4/2015 |

OTHER PUBLICATIONS

International Search Report of corresponding International PCT Application No. PCT/CN2015/10056, dated Feb. 29, 2016.

* cited by examiner

VISUAL PERCEPTION CHARACTERISTICS-COMBINING HIERARCHICAL VIDEO CODING METHOD

TECHNICAL FIELD

The invention involves video coding scheme, especially involves a visual perception characteristics-combining hierarchical video coding method.

BACKGROUND ART

With the rapid development of information processing and communication technology, IPTV, PDA, stereoscopic cinematography, 3D video and some diversity video services launched in succession, video coding show its wider development prospect in information processing and relevant area. However, the request of video quality is higher and higher, the performance index of digital video, for example, resolution, quality and frame rate improve fast while network bandwidth and memory space is limited. So, people raise some new request to video coding standard.

To obtain video coding scheme with low complexity, high quality and high compression ratio, ITU-T and ISO/IEC launched video compression standard, H.264/AVC in 2003, and in January 2010, they set up a JCT-VC (Joint Collaborative Team on Video Coding) group. The proposal suggests that HEVC use mixed coding frame of H.264/AVC, developed new coding technology to solve the contradiction between compression ratio and coding complexity of today's coding standard to adapt various kinds of network transmission, loading more information processing work. The video coding standard and its' application technology which is real-time, with high compression ratio and high definition, has become one of the hottest research spot in signal and information processing area.

Up to now, many scholars have done a lot of research in fast video encoding or visual perception area, but less of these researches have combined two areas and study it in one coding frame to optimize video coding performance.

In visual perception characteristics area, someone use color, luminance, directions and skin color as four kinds of visual characteristics to calculate interest area, but they ignore motion visual characteristics. Someone combine motion, luminance intensity, human face and character as visual characteristics, to reach interest obtain through building a visual caution model; another researcher using motion and vein information to obtain interest area; or someone propose to obtain interest area by compression domain or by wavelet transform. Because of all of global motion estimation algorithm we built is too complex, so that the complexity of visual interest area algorithm is too difficult. Video coding technology based on human visual system, mainly focus on optimizing distribution scheme of bit resource, video image quality is guaranteed when bit resource is limited. But this is short of consideration incalculating distribution, and at the same time, as for additional calculation of visual perception analyzing is complex, attention is not enough, computational efficiency need to improve.

As for fast coding area, someone control motion estimation points, to realize fast coding at cost of losing of rate-distortion; someone control coding parameter to realize fast coding. But schemes above cannot distinguish the visual importance in different area of video image. Using same coding scheme for all coding content ignore the difference of video scene of human visual system.

CONTENTS OF THE INVENTION

Aiming at these problems above, we raised a visual perception characteristics-combining hierarchical video coding method. Comprising setting priority of visual interest area and setting allocation scheme of video coding resource;

The setting priority of visual interest area mainly is: in view of the abundance of video image content and human visual selective perception mechanism, video content usually has double visual characteristics in time and space, calculation formula of [[visual characteristic saliency area]] can be expressed as:

$$ROI(x, y) = \begin{cases} 3, & ((T(x, y, MV) = 2 \text{ or } T(x, y, MV) = 1) \| S(x, y, \text{Mode}) = 1)) \\ & \text{or } S(x, y, \text{Mode}) = 2 \\ 2, & (T(x, y, MV) = 2 \text{ or } T(x, y, MV) = 1) \| S(x, y, \text{Mode}) = 0 \\ 1, & T(x, y, MV) = 0 \| S(x, y, \text{Mode}) = 1 \\ 0, & T(x, y, MV) = 0) \| (S(x, y, \text{Mode}) = 0 \end{cases}$$

ROI(x, y) represents visual interest priority of current coding macroblock, T(x, y, MV) represents time visual characteristic saliency of current coding macroblock, S(x, y, Mode) represents space visual characteristic saliency of current coding macroblock, (x, y) represents coordinate of current coding macroblock.

The setting allocation scheme of video coding resource comprises: first optimizing macroblock coding of interest area so as to improve real-time performance of the video coding, while at the same time the quality and the compression efficiency of video coding is guaranteed;

Using fast intra-frame prediction algorithm and gray scaly histogram of macroblock to describe the flat level of macroblock, according to the flat level of macroblock to select possible set of inter-frame prediction schema adaptively.

Using fast inter frame prediction algorithm, through analyzing statistical property of the probability occurrence of inter prediction schema to anticipate on specific patterns so that unnecessary pattern search and calculation of RD cost can be stopped in advance, reducing waste of time.

Using motion estimation search algorithm, based on relevance of macroblock motion vector, according to coding block movement, to identify search level, realizing high efficient search.

the setting priority of visual interest area, first, label time visual saliency area, divided into 2 steps, step 1 motion vector noise detection and step 2, translation motion vector detection, used for reduction of the influence of accuracy for estimated value due to reduce motion vector noise and translation motion vector generated by camera motion respectively. To finish the separation between foreground and background, obtain accurate labelled result about time visual saliency area which is suitable for human visual system, then, label space visual characteristics saliency area, at last, according to identified result of visual characteristics saliency area of time and space, complete the label of visual characteristics saliency area.

Step 1 noise vector calculate formula can be expressed as:

$$T_1(x, y, MV) = \begin{cases} 3, & \text{if } |\overline{V_{rr}}| = 0 \\ 2, & \text{elseif } |\vec{V}_s| \geq |\overline{V_{rr}}| \\ T_2(x, y, MV) & \text{esle} \end{cases} \quad (1)$$

(x, y) in (1) represents position coordinates, $\vec{V}_s$ represents motion vector of current macroblock, $\vec{V}_{rr}$ is average vector of motion reference area $C_{rr}$, defined as:

$$\overline{V}_{rr} = \frac{\sum_{\in C_{rr}} \vec{V}_{rr}}{num_{C_{rr}}}$$

$\vec{v}_{rr}$ represents macroblock motion vector in $C_{rr}$, $num_{C_{rr}}$ represents accumulation times $C_{rr}$ defined as: shape, position and area of reference area $C_{rr}$ can self-adapted with the change of motion vector $\vec{V}_s$ four macroblock located in upper right, upper left, lower right and lower left of $C_{rr}$ are $MB_1$, $MB_2$, $MB_3$, $MB_4$, the position coordinates defined as:

$$MB_k(x_k, y_k)_{k=1,2,3,4} = \begin{cases} MB_1(x - j_c, y - i_c) \\ MB_2(x - j_c, y + i_c) \\ MB_3(x + j_c, y - i_c) \\ MB_4(x + j_c, y + i_c) \end{cases}$$

$$i_c = \left[\frac{|\vec{V}_{sx}|}{w_s} + 1\right], j_c = \left[\frac{|\vec{V}_{sy}|}{h_s} + 1\right], |\vec{V}_{sx}|, \text{ and } |\vec{V}_{sy}|$$

are motion amplitude of current motion vector $\vec{V}_s$ in horizontal and vertical. $w_s$ and $h_s$ represents width and height of current code block. [·] represents integer calculation.

If $|\overline{V}_{rr}|=0$. there are no motion vector in $C_{rr}$, consider $\vec{V}_s$ is result from motion noise, should be removed, $\vec{V}_s$ is set as 0. Labelled as $T_1(x, y, MV)=3$ If $|\vec{V}_s| \geq |\overline{V_{rr}}|$, current code block has motion characteristic salience compare with near macroblock, which belongs to foreground dynamic area, marked as $T_1(x,y,MV)=2$ If $|\vec{V}_s| \geq |\overline{V_{rr}}|$, code block has similar motion characteristics with macroblock, the salience in time is not clear. It needs to do translation motion vector detection to confirm which area this code block belongs to, background area or foreground translation area. Marked as $T_2(x, y,MV)$.

The calculation formula of translation motion vector detection:

$$T_2(x, y, MV) = \begin{cases} 1, & \text{if } SAD_{(x,y)} \geq \overline{S}_c \\ 0, & \text{else} \end{cases} \quad (2)$$

where (x,y) represents position coordinates of current code block, $\overline{S}_c$ represents dynamic threshold, $SAD_{(x,y)}$ represents sum of absolute differences between current code block and corresponding station block in previous frame, used to characterize the change between two adjacent corresponding code blocks, defined as:

$$SAD_{(x,y)} = \sum_{i=1}^{M} \sum_{j=1}^{N} |s(i, j) - c(i, j)|$$

where s(i, j) represents pixel value of current code block, c(i, j) represents corresponding pixel value in pervious frame, M, N represents length and width of current code block respectively $\overline{S}_c$ represents average value of SAD of all code blocks in background area of pervious frame, defined as:

$$\overline{S}_c = \frac{\sum_{x,y \in S_c} SAD_{(x,y)}}{Num}$$

$S_c$ represents background area of pervious frame, $$\sum_{x,y \in S_c} SAD_{(x,y)}$$

represents the sum of SAD value of current code blocks in $S_c$, Num represents accumulation times combined with step (1) and step (2) above, formula to label the salience of visual area of time can be expressed as:

$$T(x, y, MV) = \begin{cases} 3, & \text{if } |\overline{V_{rr}}| = 0 \\ 2, & \text{elseif } |\vec{V}_s| \geq |\overline{V_{rr}}| \\ 1, & \text{elseif } SAD_{(x,y)} \geq \overline{S}_c \\ 0, & \text{else} \end{cases} \quad (3)$$

parameters of (3) are same with (1) and (2)

then, label the salience of visual area of space, calculation formula can be expressed as:

$$S(x, y, \text{Mode}) = \begin{cases} 2, & \text{Mode}_P \in \{Intra\} \\ 1, & \text{Mode}_P \in \{Inter8\} \text{ or } \text{Mode}_I \in Intra4 \times 4 \\ 0, & \text{Mode}_P \in \{Inter16\} \text{ or } \text{Mode}_I \in Intra16 \times 16 \end{cases} \quad (4)$$

where (x, y) represents position coordinates of current code block, Mode represents prediction pattern of current code block, $mode_P$ represents prediction pattern of current code block in P frame of code, $mode_I$ represents prediction pattern of current code block in I frame of code.

If $mode_P$ chose intra-frame prediction, visual characteristic salience in space is the highest, belongs to sensitive area, marked as S(x, y, Mode)=2

If $mode_P$ chose the set of sub-block prediction, Inter8(8×8, 8×4, 4×8, 4×4) or chose Intra4×4 prediction pattern, that indicates spatial detail is rich, and have high visual characteristic salience in space, belongs to the region of interest, marked as: S(x, y, Mode)=1

If $mode_P$ chose the set of Inter-prediction of macroblock, Inter16(Skip, 16×16, 16×8, 8×16) or $mode_I$ chose Intra16×16 prediction, it indicates that space change is flat, and have low visual characteristic salience in space, belongs to non-obvious area, marked as S(x, y, Mode)=0;

At last, according to the result of visual characteristics salience area identified of time and space to label visual characteristics salience area.

The specific process of fast intra frame prediction algorithm.

Step 1, calculate gray histogram of brightness component Y of current macroblock, record maximum pixels, Max Value;

Step 2, set upper threshold $Th_{high}$ and lower threshold $Th_{low}$, $Th_{high}$ and $Th_{low}$ are integer range from [1,256]

Step 3, if Max Value≥$Th_{high}$, consider macroblock flat, give up Intra4×4 prediction, chose Intra16×16 prediction, take minimum overhead rate-distortion mode as the best intra-frame prediction mode, update upper threshold at the same time:

$$Th_{high\text{-}new} = \frac{Th_{high} + MaxValue}{2},$$

otherwise, pass to step 4

Step 4, if Max Value≤$Th_{low}$, consider macroblock is rich in details, abandon Intra16×16 prediction mode, chose Intra4×4 prediction mode, take minimum overhead rate-distortion mode as the best intra-frame prediction mode, update lower threshold at the same time $$Th_{low\text{-}new} = \frac{Th_{low} + MaxValue}{2}$$

otherwise, pass to step 5

Step 5, if $Th_{low}$<Max Value<$Th_{high}$, consider the flatness of macroblock is not obvious, using standard frame prediction algorithm;

The upper threshold $Th_{high}$ and lower threshold $Th_{low}$ is set as 150 and 50 respectively The specific process of fast inter prediction algorithm:

Step 1, Pre-judging of skip mode

Step 1.1, calculate rate-distortion cost value $J_{skip}$ of skip mode (mode0), if it is lower than threshold value, stop searching for other modes, chose skip as the best prediction mode, then skip to step 4, otherwise, pass to step 1.2 where: T=(0.7−Min_cos t/18000)×Min_cos t, Min_cos t represents the best rate-distortion cost value of pervious code macroblock Step 1.2, calculate rate-distortion cost value of Inter16×16 mode (mode1) $J_{16\times16}$, If $J_{16\times16}$>$J_{skip}$, chose Skip as the best coding mode, then skip to step 4, otherwise pass to step 2

Step 2, the judgement of inter predictive mode of macroblock/sub-block

Step 2.1, calculate rate-distortion cost value $J_{16\times16}$ and $J_{8\times8}$, of Inter16×16 mode and Inter8×8 mode, If $J_{8\times8}-J_{16\times16}$>$T_0$ chose Inter16×16 mode as the best inter code modal, skip to step 4, otherwise pass to step 2.2 where $T_0$=0.2×Min_cos t, it is an adaptation experience value obtained from experiment data, the fast judgment prediction mode is guaranteed while it can reduce misjudgment ratio, Min_cos t represents the best rate-distortion cost value of pervious code macroblock step 2.2, calculate rate-distortion cost value $J_{4\times4}$ of Inter4×4 mode, If $J_{4\times4}$<min($J_{16\times16}$, $J_{8\times8}$) take segmentation of intra frame mode Inter8×8, Inter8×4, Inter4×8 and Inter4×4 (mode4~mode7) as intra frame alternative mode set. Otherwise, take macroblock level intra-frame prediction mode Inter16×16, Inter16×8, Inter8×16 (mode1~mode3) as intra frame alternative mode set, give up segmentation of intra frame mode Step 3, Inter-frame mode prediction Step 3.1, calculate the ABE (Average Boundary Error) and SBE (Summation Boundary Error) of current code macroblock, ABE reflect macroblock time coherence, ABE=SBE/64

$$SBE = \sum_{i=0}^{15} |Y_{orig}(x+i, y) - Y_{rec}(x+i, y-1)| + \sum_{i=0}^{15} |Y_{orig}(x, y+i) - Y_{rec}(x-1, y+i)|$$

where $Y_{orig}$ represents pixel value of current macroblock, $Y_{rec}$ represents pixel value of rebuild macroblock, (x, y) represents position coordinates of current macroblock Step 3.2, calculate AR (Average Rate) of current macroblock, AR reflects macroblock space coherence $$AR=\lambda \cdot Rate/384$$

λ represents lagrange gene, Rate represents bit number which macroblock needed,

Step 3.3, compare ABE and AR of macroblock, if ABE<C·AR(C=0.95), it indicates that space redundancy lower than time redundancy, give up traverse calculation of intra-frame prediction, skip to step 4, otherwise, reserve traverse calculation of intra-frame prediction, skip to step 4.

Step 4, based on rate-distortion rule to calculate and chose the best inter predictive mode, complete inter prediction coding.

The specific process of Motion estimation search algorithm.

Step 1, description of macroblock motion characteristics

Step 1.1, based on rate-distortion rule, calculate motion estimation rate-cost value RD cost$_{motion}$ of current macroblock $$J_{motion}(mv,\text{ref}|\lambda_{motion})=SAD[s,r(\text{ref},mv)]+\lambda_{motion}[R(mv-\text{pred})+R(\text{ref})]$$

where s represents current pixel value of current macroblock, mv represents macroblock motion vector, pred represents prediction vector, ref represents selected reference frame, r(ref,mv) represents pixel value of current reference macroblock, R represents consuming bit number when motion vector is doing differential encoding, including coding bit number (difference between motion vector and its' prediction value) and reference coding bit number, $\lambda_{motion}$ represents lagrange multipliers SAD represents sum of absolute differences between current block and reference block which is defined as:

$$SAD(s, c(m)) = \sum_{x=1, y=1}^{M,N} |s[x, y] - c[x - m_x, y - m_y]|$$

M,N represents width and height of current macroblock, x, y represents macroblock position, s represents real value, c represents predictive value, $m=(m_x,m_y)^T$ represents macroblock motion vector, $m_x$ and $m_y$ represents macroblock motion vector in horizontal and vertical direction, step 1.2, based on rate-distortion rule, calculate rate-cost value RD cost$_{mode}$ in mode schema $$J_{mode}(s,c, \mod e|\lambda_{mode}) = SSD(s,c, \mod e|QP) + \lambda_{mode} \times R(s,c, \mod e|QP)$$

where Mode represents inter-frame coding schema of current macroblock, S represent origin video signals, c represents rebuild video signals after mode coding, $\lambda_{mode}$ represents lagrange multipliers, R(s,c, mode|QP) represents sum of binary number including macroblock head information, motion vector and all DCT block information related to schema and quantization parameter, QP represents coding quantization step, SSD(s, c, mode) represents sum of difference of two squares between origin signals and rebuild signals $$SSD(s, c, \mod e | QP) = \sum_{i=1,j=1}^{B,B_2}(s_Y[x,y] - c_Y[x,y, \mod e | QP])^2 + \sum_{i=1,j=1}^{B,B_2}(s_U[x,y] - c_U[x,y, \mod e | QP])^2 + \sum_{i=1,j=1}^{B,B_2}(s_V[x,y] - c_V[x,y, \mod e | QP])^2$$

where $B_1$ and $B_2$ represents pixel number in horizontal and vertical direction of coding block, it can be 16, 8, 4; $s_Y[x, y]$, $c_Y[x, y, \text{mode}|QP]$ represents value of brightness signals between origin video and rebuild video, $c_U$, $c_V$ and $s_U$, $s_V$ represents corresponding value of color difference signals Step 1.3, select minimum rate distortion value RD_min cos t from RD cost$_{motion}$ and RD cost$_{mode}$;

Step 2, judgement of severe degree of macroblock motion,

The calculation formula can be expressed as:

$$\begin{cases} RD\_\min \cos t < (1+\gamma) \times pred\_\min \cos t & \text{low motion degree} \\ (1+\gamma) \times pred\_\min \cos t < RD\_\min \cos t < & \text{medium motion degree} \\ (1+\delta) \times pred\_\min \cos t & \text{high motion degree} \\ RD\_\min \cos t > (1+\delta) \times pred\_\min \cos t & \end{cases}$$

where $\gamma, \delta$ represents tuning factor of macroblock motion degree, defined as:

$$\gamma = \frac{Bsize[blocktype]}{pred\_\min \cos t^2} - \alpha_1[blocktype],$$

$$\delta = \frac{Bsize[blocktype]}{pred\_\min \cos t^2} - \alpha_2[blocktype]$$

where Bsize[blocktype] represents size of current macroblock, there are 7 kinds of value: 16×16, 16×8, 8×16, 8×8, 8×4, 4×8, 4×4; pred_min cos t are determined by motion vector prediction schema which is chosen by origin search point of UMHexagonS algorithm (1). If origin search point use time prediction motion vector, pred_min cos t chose reference frame motion vector, reference frame MV predictor;

(2). If origin search point did not use time prediction motion vector, divided into two categories:

(2.1) If the size of current motion estimation macroblock inter predictive mode is large like 16×16, 16×8, 8×16, so pred_min cos t is selected, chose median as predictive motion vector, median MV predictor;

(2.2) If the size of current motion estimation macroblock inter predictive mode is small like 8×8, 8×4, 4×8, 4×4, so select uplayer predictive motion vector as the value of pred_ min cos t Based on large amount experiments data, define array $\alpha_1$[blocktype] and array $\alpha_2$[blocktype] respectively:

$\alpha_1$[blocktype]=[−0.23, −0.23, −0.23, −0.25, −0.27, −0.27, −0.28]

$\alpha_2$[blocktype]=[−2.39, −2.40, −2.40, −2.41, −2.45, −2.45, −2.48]

Step 3. determine macroblock motion and estimate search hierarchical

Step 3.1 when macroblock motion degree is low, doing hexagonal lattice grid search from layer1 to layer3 in step "non-uniform 4 layers of hexagonal lattice grid search" of UMHexagonS algorithm Step 3.2 when macroblock motion degree is medium, doing hexagonal lattice grid search from layer1 to layer3 in step "non-uniform 4 layers of hexagonal lattice grid search" of UMHexagonS algorithm Step 3.3: when macroblock motion degree is high, doing 4 layers hexagonal lattice grid search in step "non-uniform 4 layers of hexagonal lattice grid search" of UMHexagonS algorithm.

The invention use double layer structure which are video coding layer and visual perception analysis layer to realize fast coding. The visual perception analysis layer use the information of bit stream of coding layer to analyze visual characteristic salience, label priority visual interest area, cut down calculation time of visual perception analysis dramatically. On the other hand, the multiplex perception analysis layer of coding layer which output analysis result of visual characteristic salience, calculation resource of bit allocation can be optimized, an hierarchical video coding scheme can be realized and improve coding speed. Video image quality and coding efficiency is guaranteed in this invention, at the same time, calculation speed of coding is improved, this invention reaches balance state with three parts of coding speed, subjective video image quality and Compression Rate.

DESCRIPTION OF APPENDED DRAWINGS

DESCRIPTION OF THE PREFERRED EMBODIMENTS

Figure 1A:
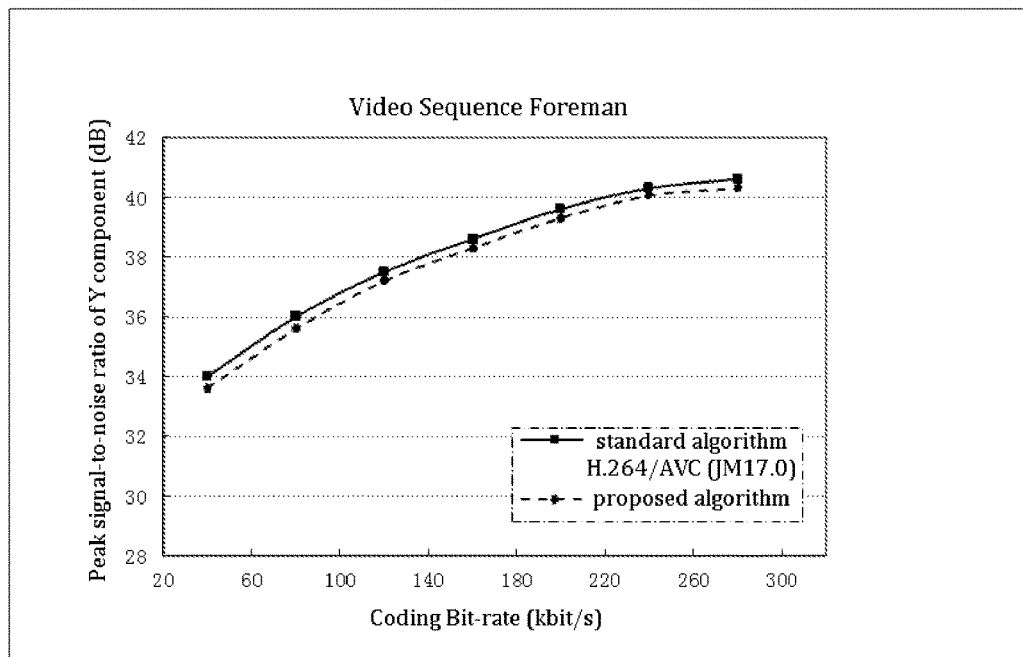
FIGS. 1A-1J show the comparative results of bit distortion performance in this invention.
Figure 1B:
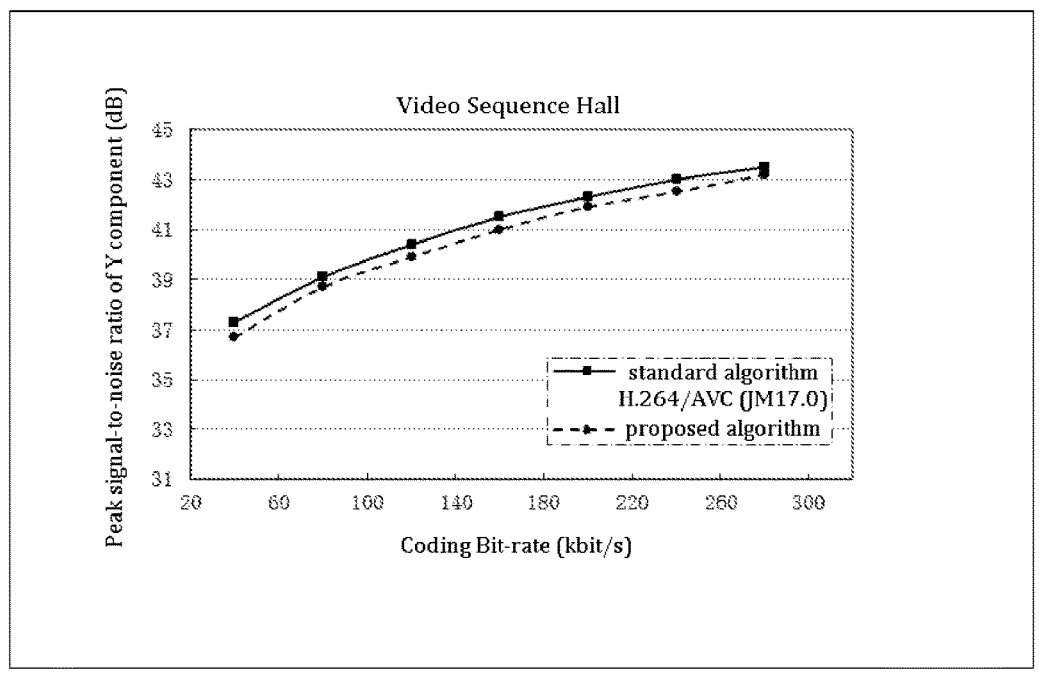
Figure 1C:
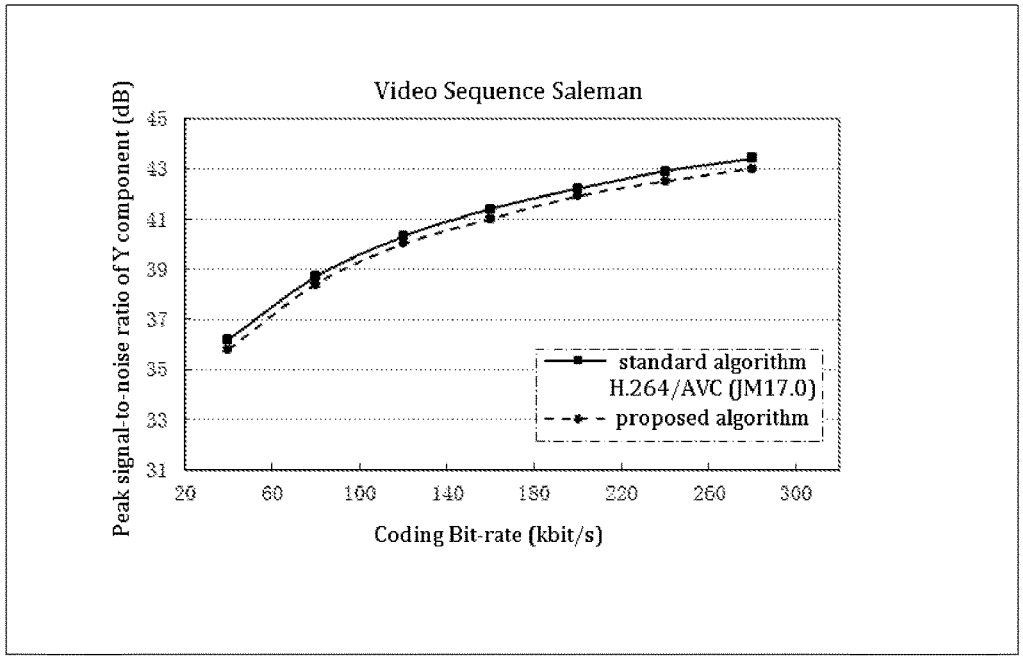
Figure 1D:
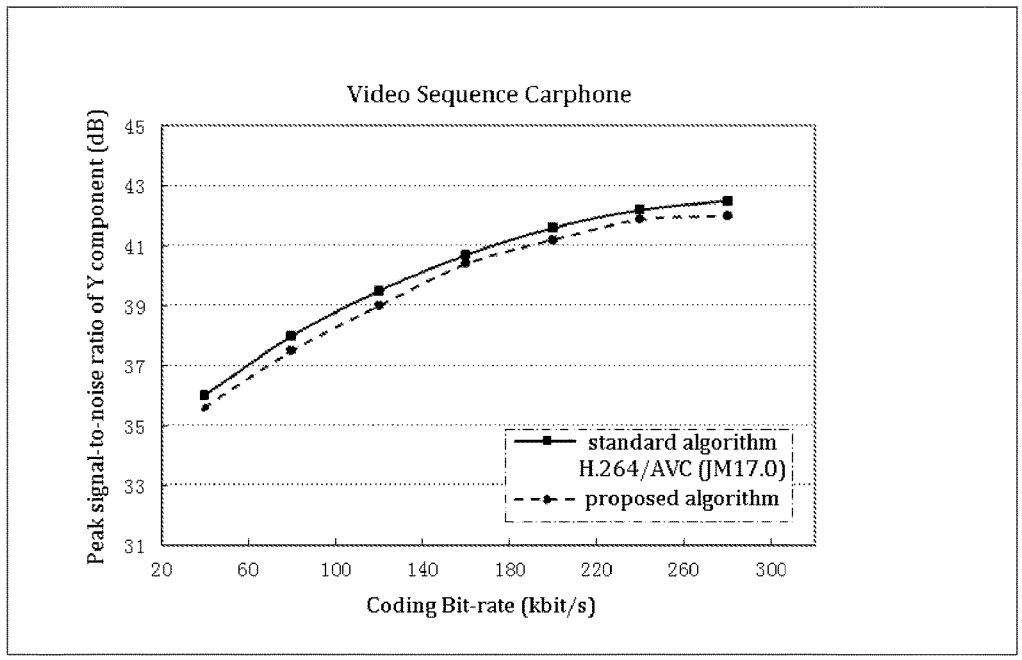
Figure 1E:
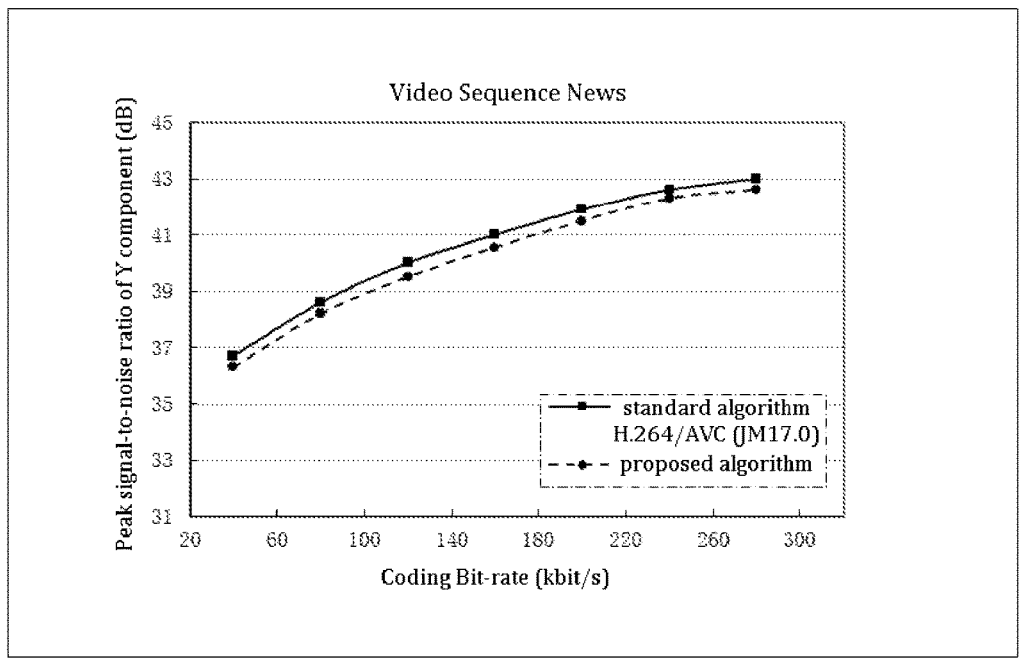
Figure 1F:
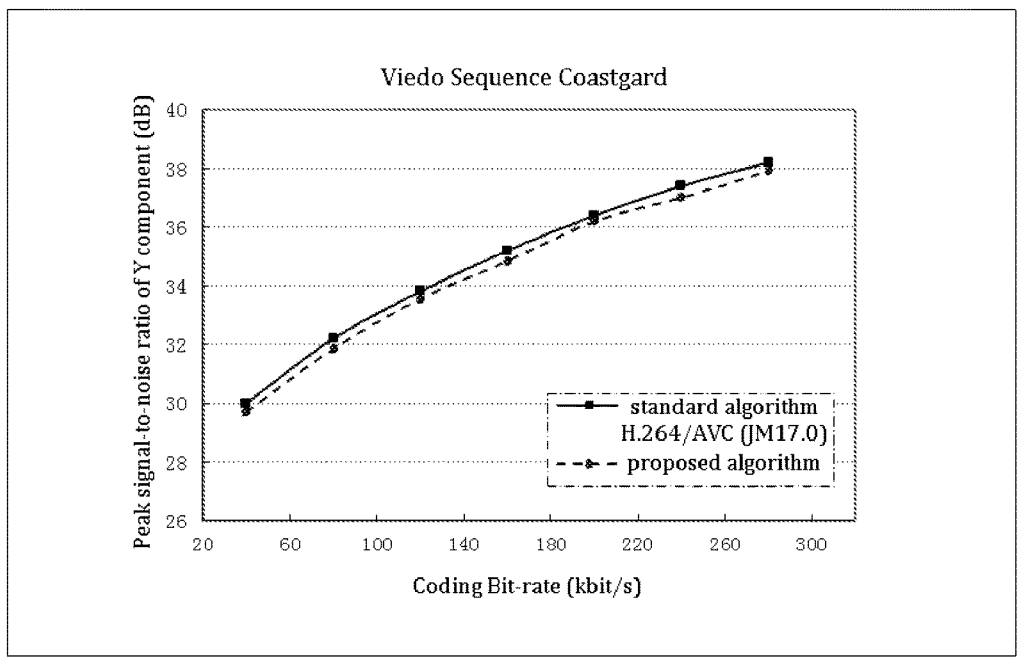
Figure 1G:
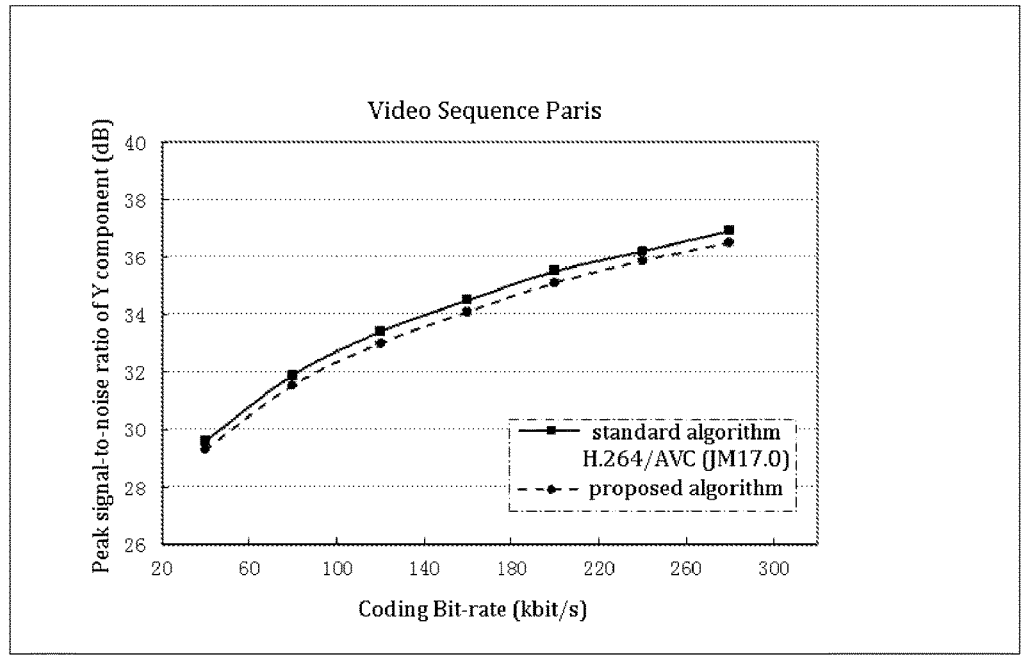
Figure 1H:
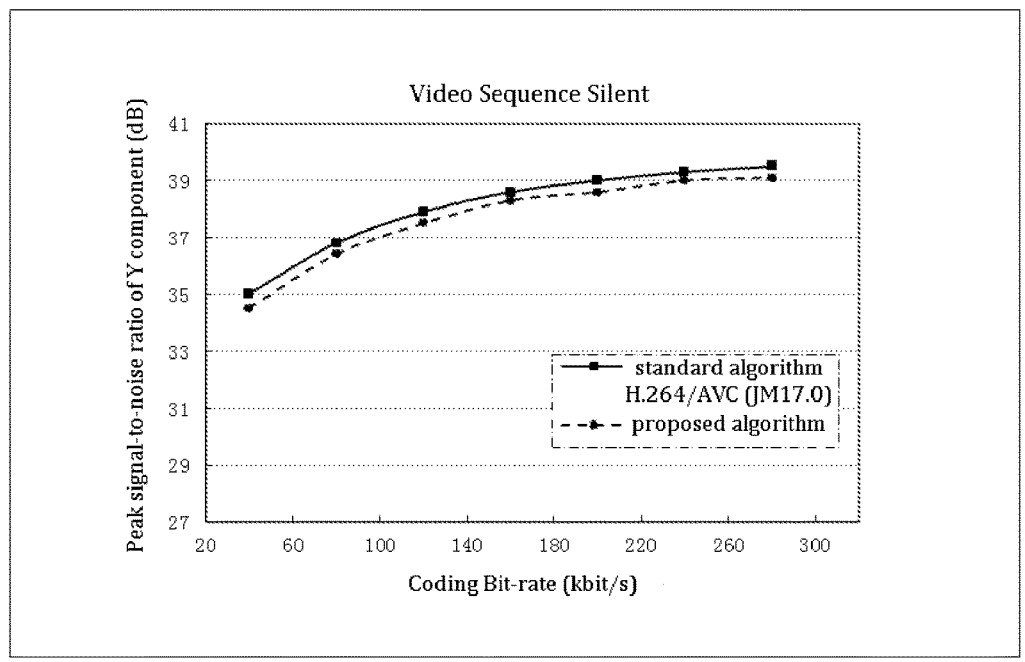
Figure 1I:
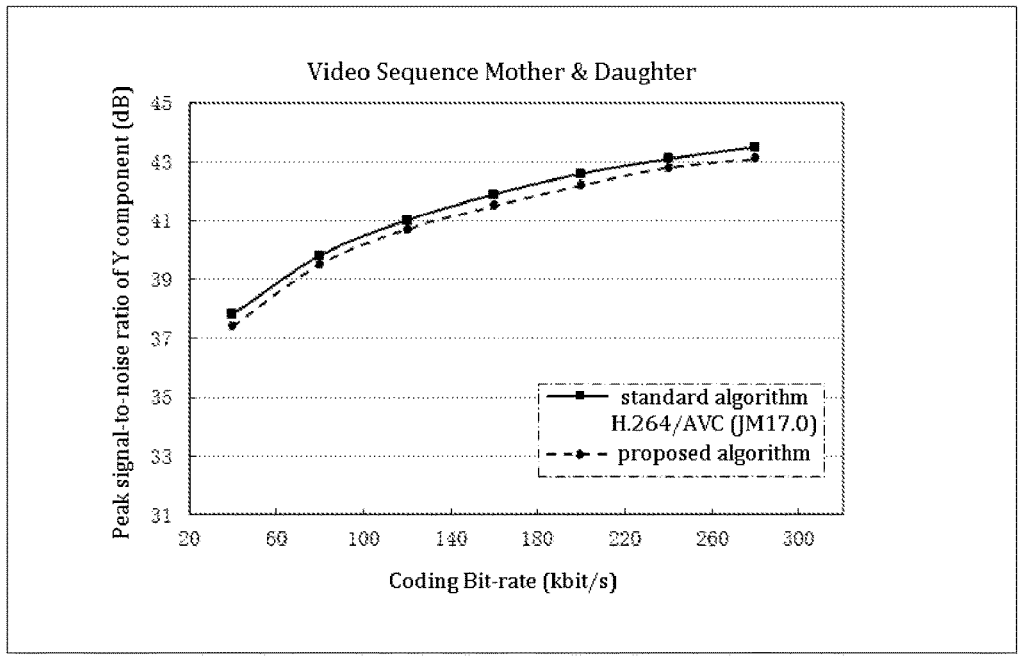
Figure 1J:
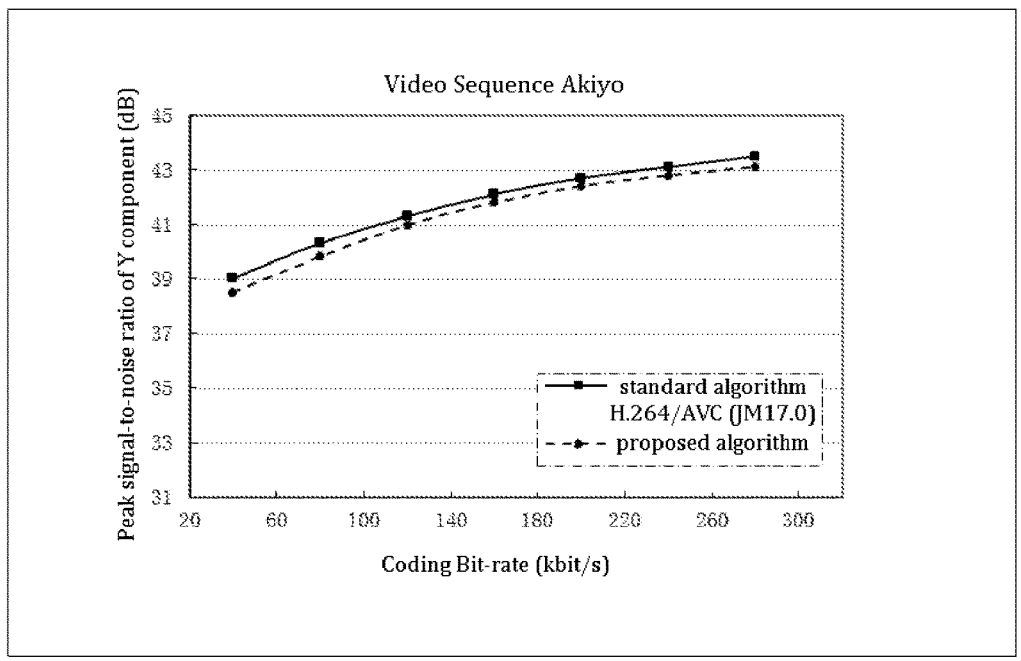

The invention will be described in more detail below accompanying the appended drawings with the preferred embodiments comprising: setting priority of visual interest area and setting allocation scheme of video coding resource. The setting priority of visual interest area mainly is: since the richness of video image content and human visual selective perception mechanism, video content usually have double visual characteristics in time and space. To cut down the calculation complexity of time and space visual characteristics of video content, a schema proposed for labelling video salience area of human eyes in time and space by using existed information of video coding bit stream.

First, the setting priority of visual interest area, first, label time visual saliency area, divided into 2 steps, step 1 motion vector noise detection and step 2, translation motion vector detection, used for reduction of the influence of accuracy for estimated value due to reduce motion vector noise and translation motion vector generated by camera motion respectively, to finish the separation between foreground and background, obtain accurate labelled result about time visual saliency area which is suitable for human visual system.

(1). Noise Detection of Motion Vector

Noise vector calculate formula can be expressed as:

$$T_1(x, y, MV) = \begin{cases} 3, & \text{if } |\overrightarrow{V_{rr}}| = 0 \\ 2, & \text{elseif } |\overrightarrow{V_s}| \geq |\overrightarrow{V_{rr}}| \\ T_2(x, y, MV) & \text{esle} \end{cases} \quad (1)$$

(x, y) in (1) represents position coordinates, $\overrightarrow{V}_s$ represents motion vector of current macroblock, $\overrightarrow{V}_{rr}$ is average vector of motion reference area $C_{rr}$, defined as:

$$\overrightarrow{V}_{rr} = \frac{\sum_{\in C_{rr}} \overrightarrow{V_{rr}}}{num_{C_{rr}}}$$

$\overrightarrow{v}_{rr}$ represents macroblock motion vector in $C_{rr}$, $num_{C_{rr}}$ represents accumulation times $C_{rr}$ defined as: shape, position and area of reference area $C_{rr}$ can self-adapted with the change of motion vector $\overrightarrow{V}_s$ four macroblocks located in upper right, upper left, lower right and lower left of $C_{rr}$ are $MB_1$, $MB_2$, $MB_3$, $MB_4$, the position coordinates defined as:

$$MB_k(x_k, y_k)_{k=1,2,3,4} = \begin{bmatrix} MB_1(x - j_c, y - i_c) \\ MB_2(x - j_c, y + i_c) \\ MB_3(x + j_c, y - i_c) \\ MB_4(x + j_c, y + i_c) \end{bmatrix}$$

$$i_c = \left[\frac{|\overrightarrow{V_{sx}}|}{w_s} + 1\right], \quad j_c = \left[\frac{|\overrightarrow{V_{sy}}|}{h_s} + 1\right], |\overrightarrow{V_{sx}}|, \text{ and } |\overrightarrow{V_{sy}}|$$

are motion amplitude of current motion vector $\overrightarrow{V}_s$ in horizontal and vertical. $w_s$ and $h_s$ represents width and height of current code block. [•] represents integer calculation If $|\overrightarrow{V}_{rr}|=0$. there is no motion vector in $C_{rr}$, consider $\overrightarrow{V}_s$ is result from motion noise, should be removed, $\overrightarrow{V}_s$ is set as 0. Labelled as $T_1(x, y, MV)=3$ If $|\overrightarrow{V}_s| \geq |\overrightarrow{V}_{rr}|$, current code block has motion characteristic salience compare with near macroblock, which belongs to foreground dynamic area, marked as $T_1(x, y, MV)=2$ If $|\overrightarrow{V}_s| \geq |\overrightarrow{V}_{rr}|$, current code block has similar motion characteristic salience with near macroblock, the salience in time is not clear, it needs to do translation motion vector detection to confirm which area this code block belongs to, background area or foreground translation area, marked as $T_2(x, y, MV)$ (2). Translation Motion Vector Detection The calculation formula of translation motion vector detection:

$$T_2(x, y, MV) = \begin{cases} 1, & \text{if } SAD_{(x,y)} \geq \overline{S}_c \\ 0, & \text{else} \end{cases} \quad (2)$$

where (x,y) represents position coordinates of current code block, $\overline{S}_c$ represents dynamic threshold, $SAD_{(x,y)}$ represents sum of absolute differences between current code block and corresponding station block in previous frame, used to characterize the change between two adjacent corresponding code blocks, defined as:

$$SAD_{(x,y)} = \sum_{i=1}^{M} \sum_{j=1}^{N} |s(i, j) - c(i, j)|$$

where s(i, j) represents pixel value of current code block, c(i, j) represents corresponding pixel value in pervious frame, M, N represents length and wide of current code block respectively $\overline{S}_c$ represents average value of SAD of all code blocks in background area of pervious frame, defined as:

$$\overline{S}_c = \frac{\sum_{x,y \in S_c} SAD_{(x,y)}}{Num}$$

$S_c$ represents background area of pervious frame, $$\sum_{x,y \in S_c} SAD_{(x,y)}$$

represents the sum of SAD value of current code blocks in $S_c$, Num represents accumulation times Combined with step (1) and step (2) above, the formula for labelling the salience of visual area of time domain can be expressed as:

$$T(x, y, MV) = \begin{cases} 3, & \text{if } |\overrightarrow{V_{rr}}| = 0 \\ 2, & \text{elseif } |\overrightarrow{V_s}| \geq |\overrightarrow{V_{rr}}| \\ 1, & \text{elseif } SAD_{(x,y)} \geq \overline{S}_c \\ 0, & \text{else} \end{cases} \quad (3)$$

parameters of (3) are same with (1) and (2)

then, label the salience of visual area of space, calculation formula can be expressed as:

$$S(x, y, Mode) = \begin{cases} 2, & Mode_P \in \{Intra\} \\ 1, & Mode_P \in \{Inter8\} \text{ or } Mode_I \in Intra4 \times 4 \\ 0, & Mode_P \in \{Inter16\} \text{ or } Mode_I \in Intra16 \times 16 \end{cases} \quad (4)$$

where (x, y) represents position coordinates of current code block, Mode represents prediction pattern of current code block, $mode_P$ represents prediction pattern of current code block in P frame of code, $mode_I$ represents prediction pattern of current code block in I frame of code, If $mode_P$ chose intra-frame prediction, visual characteristic salience in space is the highest, belongs to sensitive area, marked as S(x, y, Mode)=2;

If mode$_P$ chose the set of sub-block prediction, Inter8(8×8, 8×4, 4×8, 4×4) or chose Intra4×4 prediction pattern, that indicates spatial detail is rich, and have high visual characteristic salience in space, belongs to the region of interest, marked as: S(x, y, Mode)=1

If mode$_P$ chose the set of Inter-prediction of macroblock, Inter16(Skip, 16×16, 16×8, 8×16) or mode$_I$ chose Intra16×16 prediction, it indicates that space change is flat, and have low visual characteristic salience in space, belongs to non-obvious area, marked as S(x, y, Mode)=0;

At last, according to the result of visual characteristics salience area identified of time and space to label visual characteristics salience area.

The calculation formula is:

$$ROI(x, y) = \begin{cases} 3, & ((T(x, y, MV) = 2 \text{ or } T(x, y, MV) = 1)\| \\ & S(x, y, \text{Mode}) = 1)) \text{ or } S(x, y, \text{Mode}) = 2 \\ 2, & (T(x, y, MV) = 2 \text{ or } T(x, y, MV) = 1)\| \\ & S(x, y, \text{Mode}) = 0 \\ 1, & T(x, y, MV) = 0\|S(x, y, \text{Mode}) = 1 \\ 0, & T(x, y, MV) = 0)\|(S(x, y, \text{Mode}) = 0 \end{cases} \quad (5)$$

ROI(x, y) represents interest priority of current coding macroblock, T(x, y,MV) represents time visual characteristic saliency of current coding macroblock, S(x, y, Mode) represents space visual characteristic saliency of current coding macroblock, (x, y) represents coordinates of current coding macroblock.

The setting allocation scheme of video coding resource comprises: first optimizing macroblock coding of interest area so as to improve real-time performance of the video coding, while at the same time the quality and the compression efficiency of video coding is guaranteed;

Allocation Scheme is Shown in FIG. 1 there must have a maximum y value grey level(peak), the number of pixel point which belongs to this grey level is defined as max pixel number of current macroblock, marked as Max Value. If its' occurrence frequency of grey level is higher than another grey level of histogram apparently, it indicates that this max value is the chief component of grey level. The space coherence of macroblock is high and the macroblock is flat, it is suitable for using the set of Intra16×16 prediction mode; otherwise, its' occurrence frequency of grey level is equal to another grey level of gray histogram, it indicates that macroblock covers many grey levels, pixel grey level in macroblock changes violently, vein of macroblock is abundant, it is suitable for using the set of Intra4×4 prediction mode.

The specific process is:

Step 1, calculate gray histogram of brightness component Y of current macroblock record maximum pixels, Max Value;

Step 2, set upper threshold Th$_{high}$ and lower threshold Th$_{low}$, Th$_{high}$ and Th$_{low}$ are integer range from [1,256]

Step 3, if Max Value≥Th$_{high}$, consider macroblock flat, give up Intra4×4 prediction, chose Intra16×16 prediction, take minimum overhead rate-distortion mode as the best intra-frame prediction mode, update upper threshold at the same time:

$$Th_{high\text{-}new} = \frac{Th_{high} + MaxValue}{2},$$

otherwise, pass to step 4

Step 4, if Max Value≥Th$_{low}$, consider macroblock is rich in details, abandon Intra16×16 prediction mode, chose Intra4×4 prediction mode, take minimum overhead rate-distortion mode as the best intra-frame prediction mode, update lower threshold at the same time

FIG. 1

| Coding schema | intra-frame prediction[1] | | Inter prediction[2] | | Searching layer[3] | Reference frame |
|---|---|---|---|---|---|---|
| | Intra16 × 16 | Intra4 × 4 | Inter16 | Inter8 | | |
| P frame ROI(x, y) = 3 | Intra16 × 16 | Intra4 × 4 | — | Inter8 | Layer2-layer4 | 5 |
| ROI(x, y) = 2 | — | — | Inter16 | — | Layer1-layer3 | 3 |
| ROI(x, y) = 1 | — | — | — | Inter8 | Layer1-layer2 | 2 |
| ROI(x, y) = 0 | — | — | Inter16 | — | Layer1 | 1 |
| I frame ROI(x, y) = 1 | — | Intra4 × 4 | — | — | — | — |
| ROI(x, y) = 0 | Intra16 × 16 | — | — | — | — | — |

FIG. 1 use fast intra-frame prediction algorithm and gray scaly histogram of macroblock to describe the flat level of macroblock and according to the flat level of macroblock adaptively selecting possible set of inter-frame prediction schema.

The fundamental principle is:

Macroblock gray histogram describes gray-level of current macroblock. In mathematics, gray histogram counts occurrence probability or frequency; in graphic, gray histogram is a two-dimensional graphics, x-axis represents gray-level of macroblock, gray level from all black to all white is [0, 255]. Y-axis represents occurrence frequency of pixel point in macroblock at every grey level.

The shape of macroblock gray histogram can reflect the abundance of macroblock vein. At y-axis of gray histogram, $$Th_{low\text{-}new} = \frac{Th_{low} + MaxValue}{2}$$

otherwise, pass to step 5

Step 5, if Th$_{low}$<Max Value<Th$_{high}$, consider the flatness of macroblock is not obvious, using standard frame prediction algorithm;

Upper threshold Th$_{high}$ and lower threshold Th$_{low}$ is set as 150 and 50 respectively.

FIG. 1 use fast inter prediction algorithm, the prediction of specific mode can be found through analyzing the statistical property of occurrence probability of inter frame prediction, so searching of inter frame prediction and calculation of rate-distortion can be ended in advance.

The basic principle is:

To improve precision of coding, H.264/AVC video coding standard use 7 kinds of changeable block prediction modes of inter frame coding, every coding block can be divided into Inter16×16, Inter16×8, Inter8×16 and Inter8×8 mode, Inter8×8 mode and it can be segmented into Inter8×8, Inter8×4, Inter4×8 and Inter4×4 mode. Moreover, H.264/AVC inter frame prediction support the Skip mode and Intra16×16 and intra4×4 intra frame mode. H.264/AVC covers all possible selection of prediction modes of every coding block to obtain the best rate-distortion performance, reach the best prediction effect.

H.264/AVC is more efficient than other video coding standard because of flexible and diversified inter-frame prediction mode, but increasing of group mode which has been divided result from judgement process of inter-frame prediction mode is very complex, it increases the complexity of coding calculation fast.

Recent studies show that: video image can be divided into background vein flat area, background vein fine area and motion area. Usually, background vein flat area have the majority percentage of video content, as for these kinds of flat area and motion smooth area, most of it use Skip mode)(mode0) or macroblock level inter-frame prediction mode Inter16×16, Inter16×8, Inter8×16(mode1~mode3) to do inter-frame prediction; If it needs more coding mode to do prediction due to complex motion situation, the segmentation of inter-frame prediction mode Inter8×8, Inter8×4, Inter4×8 and Inter4×4 (mode4~mode7) can be used; Intra16×16 and Intra4×4 intra frame prediction (I16 MB, I4 MB) will be used only at edge of video image with very low occurrence probability.

Because of it, the prejudgment could be finished based on statistical property of inter-frame prediction, through diversity sieve to remove coding mode with small occurrence probability, improving coding speed.

The specific process:

Step 1. pre-judging of skip mode

Step 1.1, calculate rate-distortion cost value $J_{skip}$ of skip mode (mode0), if it is lower than threshold value, stop searching for other modes, chose skip as the best prediction mode, then skip to step 4, otherwise, pass to step 1.2 where: T=(0.7−Min_cos t/118000)×Min_cos t, Min_cos t represents the best rate-distortion cost value of pervious code macroblock Step 1.2, calculate rate-distortion cost value of Inter16×16 mode (mode1)) $J_{16 \times 16}$, If $J_{16 \times 16} > J_{skip}$, chose Skip as the best coding mode, then skip to step 4, otherwise pass to step 2

Step 2, judgement of inter predictive mode of macroblock/sub-block

Step 2.1, calculate rate-distortion cost value $J_{16 \times 16}$ and $J_{8 \times 8}$, of Inter16×16 mode and Inter8×8 mode, if $J_{8 \times 8} - J_{16 \times 16} > T_0$ chose Inter16×16 mode as the best inter code modal, skip to step 4, otherwise pass to step 2.2 where $T_0$=0.2×Min_cos t, it is an adaptation experience value obtained from experiment data, the fast judgment prediction mode is guaranteed while it can reduce misjudgment ratio, Min_cos t represents the best rate-distortion cost value of pervious code macroblock Step 2.2, calculate rate-distortion cost value $J_{4 \times 4}$ of Inter4×4 mode, If $J_{4 \times 4} < \text{Min}(J_{16 \times 16}, J_{8 \times 8})$ take segmentation of intra frame mode Inter8×8, Inter8×4, Inter4×8 and Inter4×4 (mode4~mode1) as intra frame alternative mode set, otherwise, take macroblock level inter-frame prediction mode Inter16×16, Inter16×8, Inter8×16 (mode1~mode3) as intra frame alternative mode set, give up segmentation of intra frame mode Step 3, Inter-frame mode prediction Step 3.1, calculate ABE (Average Boundary Error) and SBE (Summation Boundary Error) of current code macroblock, ABE reflect macroblock time coherence, ABE=SBE/64

$$SBE = \sum_{i=0}^{15} |Y_{orig}(x+i, y) - Y_{rec}(x+i, y-1)| + \sum_{i=0}^{15} |Y_{orig}(x, y+i) - Y_{rec}(x-1, y+i)|$$

where $Y_{orig}$ represents pixel value of current macroblock, $Y_{rec}$ represents pixel value of rebuild macroblock, (x, y) represents position coordinates of current macroblock, Step 3.2, calculate AR (Average Rate) of current macroblock, AR reflects macroblock space coherence, $AR=\lambda \text{ Rate}/384$ λ represents lagrange gene, Rate represents bit number which macroblock needed Step 3.3, compare ABE and AR of macroblock, if ABE<C·AR(C=0.95), it indicates that space redundancy lower than time redundancy, give up traverse calculation of intra-frame prediction skip to step 4, otherwise, reserve traverse calculation of intra-frame prediction, skip to step 4

Step 4, based on rate-distortion rule to calculate and chose the best inter predictive mode, complete inter prediction coding The basic principle is:

H.264/AVC standard use UMHexagonS algorithm, it is one of the best motion estimate algorithm. But after analyzing large amount of experiment data, the best matching points is uneven distribute in every search step of UMHexagonS algorithm, But in step "Non-uniform 4 levels of hexagonal lattice grid search" of UMHexagonS algorithm, there have no analysis of relevance between motion characteristic of coding block and searching range. No matter how motion level of macroblock is, it must finish 4 layer Non-uniform hexagon search, (4 layer×16 search points/layer=64 search points) so that it can do next step of searching, the calculation amount is huge. As for macroblock in motion flat area which have large percent of video content, large searching radius and searching points on outer layer has little contribution for improving the accuracy of motion estimation, but it waste long time to estimate motion. On the other hand, as for minorblock which is in violent motion, the coverage calculation cost for inner layer points caused consuming of time. It indicates that the intensity of motion have a inevitable relevance with motion estimation searching layer of the best matching point.

If the selection of searching layer could be self-adapted based on macroblock motion level, number of searching points will be saved undoubtedly, reduce calculation complexity of motion estimation. Selection of characteristic and principles to judge motion level of macroblock is a key factor for optimizing motion estimation algorithm.

Because of it, this invention use non-uniform hexagonal grid search with self-adapted searching layer and the change of macroblock motion level, instead of 4 layer non-uniform hexagonal grid search in pervious UMHexagonS algorithm. First, describe motion characteristics of macroblock, and divide it into 3 level: low motion level, medium motion level, high motion level; At last, select corresponding searching layer based on motion level.

The specific process is:

Step 1, description of macroblock motion characteristics

Step 1.1, based on rate-distortion rule, calculate motion estimation rate-cost value RD cost$_{motion}$ of current macroblock $$J_{motion}(mv, \text{ref}|\lambda_{motion}) = SAD[s, r(\text{ref}, mv)] + \lambda_{motion}[R(mv-\text{pred}) + R(\text{ref})]$$

where s represents current pixel value of current macroblock, mv represents macroblock motion vector, peed represents prediction vector, ref represents selected reference frame, r(ref,mv) represents pixel value of current reference macroblock, R represents consuming bit number when motion vector is doing differential encoding, including coding bit number (difference between motion vector and its' prediction value) and reference coding bit number, $\lambda_{motion}$ represents lagrange multipliers SAD represents sum of absolute differences between current block and reference block which is defined as:

$$SAD(s, c(m)) = \sum_{x=1, y=1}^{M,N} |s[x, y] - c[x - m_x, y - m_y]|$$

M, N represents width and height of current macroblock, x, y represents macroblock position, s represents real value, c represents predictive value, $m=(m_x, m_y)^T$ represents macroblock motion vector, $m_x$ and $m_y$ represents macroblock motion vector in horizontal and vertical directions Step 1.2, based on rate-distortion rule, calculate rate-cost value RD cost$_{mode}$ in mode schema, $$J_{mode}(s, c, \text{mod } e|\lambda_{mode}) = SSD(s, c, \text{mod } e|QP) + \lambda_{mode} \times R(s, c, \text{mod } e|QP)$$

where Mode represents inter-frame coding schema of current macroblock, S represent origin video signals, c represents rebuild video signals after mode coding, $\lambda_{mode}$ represents lagrange multipliers, R(s,c, mode|QP) represents sum of binary number including macroblock head information, motion vector and all DCT block information related to schema and quantization parameter, QP represents coding quantization step, SSD(s, c, mode) represents sum of difference of two squares between origin signals and rebuild signals $$SSD(s, c, \text{mod } e | QP) = \sum_{i=1, j=1}^{B, B_2} (s_Y[x, y] - c_Y[x, y, \text{mod } e | QP])^2 +$$

$$\sum_{i=1, j=1}^{B, B_2} (s_U[x, y] - c_U[x, y, \text{mod } e | QP])^2 +$$

$$\sum_{i=1, j=1}^{B, B_2} (s_V[x, y] - c_V[x, y, \text{mod } e | QP])^2$$

where $B_1$ and $B_2$ represents pixel number in horizontal and vertical direction of coding block, it can be 16, 8, 4; $s_Y[x, y]$, $c_Y[x, y, \text{mode}|QP]$ represents value of brightness signals between origin video and rebuild video, $c_U$, $c_V$, and $s_U$, $s_V$ represents corresponding value of color difference signals Step 1.3, select minimum rate distortion value RD_min cos t from RD cost$_{motion}$ and RD cost$_{mode}$;

Step 2, judgement of severe degree of macroblock motion

Calculation formula can be expressed as:

$$\begin{cases} \text{RD\_mincos } t < (1 + \gamma) \times \text{pred\_mincos } t & \text{low motion degree} \\ (1 + \gamma) \times \text{pred\_mincos } t < \text{RD\_mincos } t < & \text{medium motion degree} \\ (1 + \delta) \times \text{pred\_mincos } t & \\ \text{RD\_mincos } t > (1 + \delta) \times \text{pred\_mincos } t & \text{high motion degree} \end{cases}$$

where $\gamma, \delta$ represents tuning factor of macroblock motion degree, defined as:

$$\gamma = \frac{Bsize[blocktype]}{\text{pred\_mincos } t^2} - \alpha_1[blocktype],$$

$$\delta = \frac{Bsize[blocktype]}{\text{pred\_mincos } t^2} - \alpha_2[blocktype]$$

where B size[blocktype] represents size of current macroblock, there are 7 kinds of value: 16×16, 16×8, 8×16, 8×8, 8×4, 4×8, 4×4; pred_min cos t are determined by motion vector prediction schema which is chosen by origin search point of UMHexagonS algorithm, (1). If origin search point use time prediction motion vector, pred_min cos t chose reference frame motion vector, reference frame MV predictor;

(2). If origin search point did not use time prediction motion vector, divided into two categories:

(2.1) If size of current motion estimation macroblock inter predictive mode is large like 16×16, 16×8, 8×16, so pred_min cos t is selected, chose median as predictive motion vector, median MV predictor;

(2.2) If size of current motion estimation macroblock inter predictive mode is small like 8×8, 8×4, 4×8, 4×4, so select upper layer predictive motion vector as the value of pred_min cos t, Based on large amount experiments data, define array $\alpha_1$[blocktype] and array $\alpha_2$[blocktype] respectively:

$\alpha_1$[blocktype]=[−0.23, −0.23, −0.23, −0.25, −0.27, −0.27, −0.28]

$\alpha_2$[blocktype]=[−2.39, −2.40, −2.40, −2.41, −2.45, −2.45, −2.48]

Step 3. determine macroblock motion and estimate search hierarchical

Step 3.1 when macroblock motion degree is low, doing hexagonal lattice grid search from layer1 to layer3 in step "non-uniform 4 layers of hexagonal lattice grid search" of UMHexagonS algorithm Step 3.2 when macroblock motion degree is medium, doing hexagonal lattice grid search from layer1 to layer3 in step "non-uniform 4 layers of hexagonal lattice grid search" of UMHexagonS algorithm Step 3.3: when macroblock motion degree is high, doing 4 layers hexagonal lattice grid search in step "non-uniform 4 layers of hexagonal lattice grid search" of UMHexagonS algorithm.

In P frame coding, according to formula (5):

When ROI(x, y)=3, in condition ①, coding macroblock belongs to foreground dynamic area(T(x, y,MV)=2) or foreground translation area(T(x, y,MV)=1), have visual characteristics in time, and S(x, y, Mode)=1 indicates that macroblock chose Inter8 set of inter frame sub-block prediction mode, have visual characteristics in space also, belongs to evident visual characteristics area and vein richness area. When S(x, y, Mode)=2 in condition ② it indicates that P frame use intra frame prediction mode of coding macroblock, belongs to visual characteristics sensitive area in space. Human eyes have the highest interest in these 2 conditions, traverse execution of Inter8 set fast inter frame prediction and fast intra frame prediction, run layer2-layer4 of motion estimation searching, the number of frames which allowed as reference are 5.

When ROI(x, y)=2, coding macroblock have visual characteristics in time T(x, y,MV)=2 or T(x, y,MV)=1), and S(x, y, Mode)=0, indicates that macroblock chose Inter16 set of inter frame sub-block prediction mode, visual characteristics in space is not evident, belongs to evident visual characteristics area in time and vein flat area, human eyes interest is lower than above, intra frame prediction is elided, only traverse execution of Inter16 set fast inter frame prediction, run layer1-layer3 of motion estimation searching, the number of frames which allowed as reference are 3.

When ROI(x, y)=1, there have no visual characteristics of macroblock in time (T(x, y,MV)=0), belongs to non-dynamic background area, and S(x, y, Mode)=1 indicates that macroblock chose Inter8 set of inter frame sub-block prediction mode, have visual characteristics in space, belongs to visual attention area, human eyes interest is lower than the second one above, intra frame prediction is elided, only traverse execution of Inter8 set fast inter frame prediction, run layer1-layer2 of motion estimation searching, the number of frames which allowed as reference is only 1.

When ROI(x, y)=0, indicates that there are no visual characteristics in time and space of current macroblock, belongs to static flat background area with low interest of human eyes, only traverse execution of Inter16 set fast inter frame prediction, run layer1 of motion estimation searching, the number of frames which allowed as reference is 1.

In I frame coding, according to formula (5):

When ROI(x, y)=1, there have no visual characteristic in time of current macroblock (T(x, y,MV)=0), and S(x, y, Mode)=1, indicates that macroblock chose Intra4×4 prediction mode, have abundant space details, also have higher visual characteristics salience in space, belongs to the area of interest, Intra16×16 prediction is elided.

When ROI(x, y)=0, there are no visual characteristics in time and space of current macroblock, belongs to static flat background area with low interest of human eyes, only run Intra16×16 prediction mode.

In conclusion, first, analysis and detection of high efficient visual perception characteristics is realized based on low-level coding information in the invention, and then according to the label results of video interest area priority to conduct the selection of coding schema, alternative mode set of predictive code and range of motion estimation searching can be simplified, reduce number of reference frame, lower calculation complexity of video coding.

Figure 2:
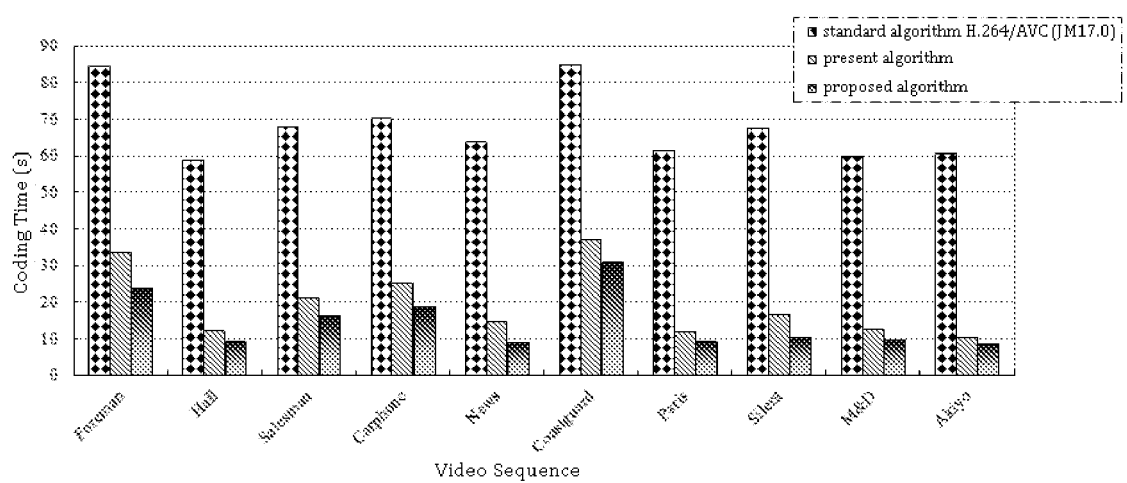
FIG. 2 shows the comparative results of calculation complexity.

The invention also published simulation and statistic results:

FIG. 2: Performance of this invention compare with H.264/AVC(JM17.0) standard algorithm.

FIG. 2

| video sequence | QP | ΔTime (%) | ΔBit (%) | PSNR-Y Δ (dB) | ROI-PSNR-Y Δ (dB) |
|---|---|---|---|---|---|
| Foreman | 28 | −71.24 | +2.19 | −0.30 | −0.25 |
|  | 32 | −71.92 | +2.15 | −0.29 | −0.21 |
|  | 36 | −70.81 | +2.06 | −0.17 | −0.15 |
| Hall | 28 | −83.64 | +1.24 | −0.21 | −0.19 |
|  | 32 | −84.27 | +1.17 | −0.22 | −0.14 |
|  | 36 | −84.98 | +1.12 | −0.19 | −0.13 |
| Salesman | 28 | −76.43 | +2.12 | −0.26 | −0.21 |
|  | 32 | −75.92 | +1.87 | −0.20 | −0.15 |
|  | 36 | −76.01 | +1.83 | −0.14 | −0.12 |
| Car-phone | 28 | −73.85 | +2.84 | −0.32 | −0.24 |
|  | 32 | −73.36 | +2.57 | −0.21 | −0.19 |
|  | 36 | −74.96 | +1.69 | −0.14 | −0.12 |
| News | 28 | −85.47 | +2.14 | −0.13 | −0.11 |
|  | 32 | −85.84 | +2.13 | −0.12 | −0.07 |
|  | 36 | −85.93 | +1.86 | −0.09 | −0.08 |
| Coastguard | 28 | −61.24 | +2.47 | −0.28 | −0.24 |
|  | 32 | −62.35 | +2.13 | −0.29 | −0.26 |
|  | 36 | −62.62 | +1.76 | −0.21 | −0.18 |
| Paris | 28 | −84.12 | +1.07 | −0.29 | −0.23 |
|  | 32 | −84.61 | +1.15 | −0.22 | −0.21 |
|  | 36 | −84.97 | +1.03 | −0.21 | −0.17 |
| Silent | 28 | −80.14 | +1.51 | −0.24 | −0.18 |
|  | 32 | −80.86 | +1.42 | −0.18 | −0.15 |
|  | 36 | −81.32 | +1.17 | −0.11 | −0.09 |
| Mother & Daughter | 28 | −83.76 | +1.85 | −0.18 | −0.14 |
|  | 32 | −83.89 | +1.64 | −0.10 | −0.10 |
|  | 36 | −84.21 | +0.09 | −0.08 | −0.05 |
| Akiyo | 28 | −85.64 | +1.87 | −0.11 | −0.09 |
|  | 32 | −85.76 | +1.21 | −0.08 | −0.07 |
|  | 36 | −86.41 | +0.08 | −0.07 | −0.06 |
| The average results |  |  |  |  |  |
| QP | 28 | −78.55 | +1.93 | −0.188 dB | −0.153 dB |
|  | 32 | −78.88 | +1.74 |  |  |
|  | 36 | −79.22 | +1.27 |  |  |

FIG. 2 show 10 standards test sequences which have different motion characteristics based on invention schema and performance comparison with H.264/AVC(JM17.0) standard algorithm.

When quantization step QP are 28, 32, 36 respectively, compare with H.264/AVC(JM17.0) standard algorithm, the invention can save coding time with 80% in average; control the increasing of bit rate output within 2% in average; PSNR-Y reduced −0.188 dB in average, PSNR-Y in visual interest area reduced −0.153 dB in average, the priority of video coding quality in visual characteristics perception area is guaranteed, accord with the insensitivity of quality degradation of human eyes in visual characteristics perception area.

As for controlling of bit rate output, the 2 rate-distortion R-D performance curve is very close to each other, indicates that the invention have advantages of low bit rate and high quality similar with H.264/AVC standard algorithm.

As for reconstruction quality of video image, the average decline of PSNR-Y is guaranteed within −0.2 dB, which is much less than min sensitive value of image change perception (−0.5 dB) of human eyes, so that reconstruction of video quality is well maintained.

As for improvement of coding speed, the data in FIG. 2 indicates that compare with H.264/AVC standard algorithm and other current algorithm, the invention have lower calculation complexity. As for Akiyo, Newssequences with gently motion and flat vein, compare with H.264/AVC (JM17.0), the invention can save coding time more than 85% in average.

The invention proposed a visual perception characteristics-combining hierarchical video coding method, which can improve coding speed greatly at the same time maintain well subjective quality of video image. Experiment result shows that the possibility of using coding information entirely to analyze visual perception with low complexity, the consistence between analyzing results of visual characteristic salience perception and HVS, proving reasonability of scalable coding schema based on visual perception characteristics.

What is claimed is:

1. A visual perception characteristics-combining hierarchical video coding method comprising:
setting priority of visual interest area and setting allocation scheme of video coding resource; wherein:
the setting priority of visual interest area mainly is: calculation formula for labeling visual characteristic saliency area is expressed as:

$$ROI(x, y) = \begin{cases} 3, & ((T(x, y, MV) = 2 \, or \, T(x, y, MV) = 1) \,||\, S(x, y, Mode) = 1)) \, or \, S(x, y, Mode) = 2 \\ 2, & (T(x, y, MV) = 2 \, or \, T(x, y, MV) = 1) \,||\, S(x, y, Mode) = 0 \\ 1, & T(x, y, MV) = 0 \,||\, S(x, y, Mode) = 1 \\ 0, & T(x, y, MV) = 0) \,||\, (S(x, y, Mode) = 0 \end{cases}$$

where $ROI(x, y)$ represents visual interest priority of current coding macroblock, $T(x, y, MV)$ represents time visual characteristic saliency of current coding macroblock, $S(x, y, Mode)$ represents space visual characteristic saliency of current coding macroblock, $(x, y)$ represents coordinate of current coding macroblock,
the setting allocation scheme of video coding resource comprises optimization of macroblock coding of the visual interest area so as to improve real-time performance of video coding;
using fast intra-frame prediction algorithm and gray scaly histogram of macroblock to describe a flat level of macroblock and according to the flat level of macroblock to select possible set of intra-frame prediction modes;
using fast inter-frame prediction algorithm, through analyzing statistical characteristics of probability of occurrence of inter-frame prediction modes, to prejudge specific inter-frame prediction modes so that unnecessary inter-frame prediction mode search and calculation of RD cost can be stopped in advance;
using motion estimation search algorithm, based on relevance of macroblock motion vector, according to coding block movement, to identify search level, realizing high efficient search;
wherein the setting priority of visual interest area comprises:
labeling time visual characteristic saliency area, which includes step 1 and step 2, step 1 being motion vector noise detection and step 2 being translation motion vector detection, the motion vector noise detection and the translation motion vector detection are used for reduction of the influence to accuracy of time visual saliency area measurement due to motion vector noise and translation motion vector generated by camera motion respectively, and to perform separation between foreground and background,
labeling space visual characteristic saliency area, and
labeling, according to labeling results of the time visual characteristic saliency area and the space visual characteristic saliency area, the visual characteristic saliency area;
wherein: when labeling the time visual characteristic saliency area, calculation formula for the motion vector noise detection in step 1 is expressed as:

$$T_1(x, y, MV) = \begin{cases} 3, & \text{if } |\vec{V_{rr}}| = 0 \\ 2, & \text{elseif } |\vec{V_s}| \geq |\vec{V_{rr}}| \\ T_2(x, y, MV) & \text{esle} \end{cases} \quad (1)$$

where $(x, y)$ in (1) represents position coordinates, $\vec{V_s}$ represents motion vector of current macroblock, $\vec{V_{rr}}$ is average vector of motion reference area $C_{rr}$, defined as:

$$\vec{V_{rr}} = \frac{\sum_{\in C_{rr}} \vec{v_{rr}}}{num_{C_{rr}}}$$

$\vec{v_{rr}}$ represents macroblock motion vector in $C_{rr}$, $num_{C_{rr}}$ represents accumulation times
$C_{rr}$ is defined so that shape, position and area of reference area $C_{rr}$ can be adaptively adjusted with the change of motion vector $\vec{V_s}$
four macroblocks located in upper right, upper left, lower right and lower left of $C_{rr}$ are $MB_1$, $MB_2$, $MB_3$, $MB_4$, position coordinates of $MB_1$, $MB_2$, $MB_3$, $MB_4$ are defined as:

$$MB_k(x_k, y_k)_{k=1,2,3,4} = \begin{cases} MB_1(x - j_c, y - i_c) \\ MB_2(x - j_c, y + i_c) \\ MB_3(x + j_c, y - i_c) \\ MB_4(x + j_c, y + i_c) \end{cases} \text{ where}$$

$$i_c = \left[\frac{|\vec{V_{sx}}|}{w_s} + 1\right], j_c = \left[\frac{|\vec{V_{sy}}|}{h_s} + 1\right], |\vec{V_{sx}}|, \text{ and } |\vec{V_{sy}}|$$

are motion amplitude of current motion vector $\vec{V_s}$ in horizontal and vertical, $w_s$ and $h_s$ represent width and height of current code block, respectively, [•] represents integer calculation,
if $|\vec{V_{rr}}|=0$, it indicates that there is no motion vector in $C_{rr}$, so that $\vec{V_s}$ is caused by motion noise and thus is removed, and $\vec{V_s}$ is set as 0, and labeled as $T_1(x, y, MV)=3$,
if $|\vec{V_s}| \geq |\vec{V_{rr}}|$, it indicates that current code block has higher motion characteristic saliency than adjacent macroblocks, which belongs to foreground dynamic area, and labeled as $T_1(x, y, MV)=2$,
otherwise, current code block has substantially the same motion characteristic saliency as adjacent macroblocks, then translation motion vector detection is performed to confirm whether the current code block belongs to background area or foreground translation area, which is labeled as $T_2(x, y, MV)$,
calculation formula of translation motion vector detection of step 2 is:

$$T_2(x, y, MV) = \begin{cases} 1, & \text{if } SAD_{(x,y)} \geq \bar{S_c} \\ 0, & \text{else} \end{cases} \quad (2)$$

where $(x,y)$ represents position coordinates of current code block, $\bar{S_c}$ represents dynamic threshold, $SAD_{(x,y)}$ represents sum of absolute differences between current code block and corresponding station block in previous frame, used to characterize the change between two adjacent corresponding code blocks, defined as:

$$SAD_{(x,y)} = \sum_{i=1}^{M} \sum_{j=1}^{N} |s(i, j) - c(i, j)|$$

where s(i, j) represents pixel value of current code block, c(i, j) represents corresponding pixel value in pervious frame, M、N represents length and wide of current code block respectively,
$\overline{S}_c$ represents average value of SAD of all code blocks in background area of pervious frame, defined as:

$$\overline{S}_c = \frac{\sum_{x,y \in S_c} SAD_{(x,y)}}{Num}$$

$S_c$ represents background area of pervious frame, $$\sum_{x,y \in S_c} SAD_{(x,y)}$$

represents the sum of SAD value of current code blocks in $S_c$、Num represents accumulation times,
formula for labeling the time visual characteristic saliency area is expressed as:

$$T(x, y, MV) = \begin{cases} 3, & \text{if } |\overrightarrow{V_{rr}}| = 0 \\ 2, & \text{elseif } |\overrightarrow{V_s}| \geq |\overrightarrow{V_{rr}}| \\ 1, & \text{elseif } SAD_{(x,y)} \geq \overline{S}_c \\ 0, & \text{else} \end{cases} \quad (3)$$

where parameters of (3) are same with (1) and (2)
then, performing labeling of the space visual characteristic saliency area, calculation formula is expressed as:

$$S(x, y, \text{Mode}) = \begin{cases} 2, & \text{Mode}_P \in \{Intra\} \\ 1, & \text{Mode}_P \in \{Inter8\} \text{ or } \text{Mode}_I \in Intra4 \times 4 \\ 0, & \text{Mode}_P \in \{Inter16\} \text{ or } \text{Mode}_I \in Intra16 \times 16 \end{cases} \quad (4)$$

where (x, y) represents position coordinates of current code block, Mode represents prediction pattern of current code block, $\text{mode}_P$ represents prediction pattern of current code block in P frame of code, $\text{mode}_I$ represents prediction pattern of current code block in I frame of code,
if $\text{mode}_P$ chooses intra-frame prediction mode, it indicates that space visual characteristic saliency is the highest, which belongs to sensitive area, and is labeled as S(x, y, Mode)=2;
if $\text{mode}_P$ chooses a set of sub-block prediction modes, Inter8(8×8, 8×4, 4×8, 4×4) or Intra4×4 prediction mode, it indicates that spatial detail is rich, and the space visual characteristic saliency is high, which belongs to interest area, and is labeled as: S(x, y, Mode)=1;

if $\text{mode}_P$ chooses a set of inter-frame prediction modes, Inter16(Skip, 16×16, 16×8, 8×16) or $\text{mode}_I$ chooses Intra16×16 prediction mode, it indicates that spatial change is flat, and the space visual characteristic saliency is low, which belongs to non-obvious area, and labeled as S(x, y,Mode)=0;
labeling, according to labeling results of the space visual characteristic saliency area and the time visual characteristic saliency area, the visual characteristic saliency area.

2. The visual perception characteristics-combining hierarchical video coding method according to claim 1, wherein the fast intra-frame prediction algorithm comprises:
step 1, calculate gray histogram of brightness component Y of current macroblock, and record maximum pixels thereof, Max Value;
step 2, set upper threshold $Th_{high}$ and lower threshold $Th_{low}$, wherein $Th_{high}$ and $Th_{low}$ are integer in a range from 1 to 256;
step 3, if Max Value≥$Th_{high}$, it indicates that macroblock is flat, then abandon Intra4×4 prediction modes, choose Intra16×16 prediction modes, take a prediction mode with minimum rate-distortion cost as best intra-frame prediction mode, and update the upper threshold to $Th_{high-new}$:

$$Th_{high-new} = \frac{Th_{high} + MaxValue}{2},$$

otherwise, pass to step 4;
step 4, if Max Value≤$Th_{low}$, it indicates that macroblock is rich in details, then abandon Intra16×16 prediction mode, choose Intra4×4 prediction mode, take a prediction mode with minimum rate-distortion cost as optimal intra-frame prediction mode, and update the lower threshold to $Th_{low-new}$:

$$Th_{low-new} = \frac{Th_{low} + MaxValue}{2},$$

otherwise, pass to step 5;
step 5, if $Th_{low}$ <Max Value<$Th_{high}$, it indicates that flatness of macroblock is not obvious, then using standard frame prediction algorithm.

3. The visual perception characteristics-combining hierarchical video coding method according to claim 1, wherein the fast inter-frame prediction algorithm comprises:
step 1, pre-judging of skip mode;
step 1.1, calculate rate-distortion cost value $J_{skip}$ of skip mode, if it is lower than a threshold value T, stop searching for other modes, choose skip as best prediction mode, then skip to step 4, otherwise, pass to step 1.2,
where: T=(0.7−Min_cos t/18000)×Min_cos t, Min_cos t represents best rate-distortion cost value of pervious code macroblock;
step 1.2, calculate rate-distortion cost value $J_{16×16}$ of Inter16×16 mode if $J_{16×16}$>$J_{skip}$, choose skip as best coding mode, then skip to step 4, otherwise pass to step 2;
step 2, the judgment of inter-frame prediction mode of macroblock/sub-block;
step 2.1, calculate rate-distortion cost value $J_{16×16}$ and $J_{8×8}$, of Inter16×16 mode and Inter8×8 mode, if $J_{8×8}$−

$J_{16\times16} > T_0$, choose Inter16×16 mode as best inter-frame coding mode, skip to step 4, otherwise pass to step 2.2, where $T_0=0.2\times$Min_cos t, which is an empirical threshold value obtained from experiment data, Min_cos t represents best rate-distortion cost value of pervious code macroblock;

step 2.2, calculate rate-distortion cost value $J_{4\times4}$ of Inter4×4 mode, if $J_{4\times4}<\min(J_{16\times16}, J_{8\times8})$, take inter-frame subsegmentation prediction mode Inter8×8, Inter8×4, Inter4×8 and Inter4×4 as alternative inter-frame prediction mode set, otherwise, take macroblock level inter-frame prediction mode Inter16×16, Inter16×8, Inter8×16 as alternative inter-frame prediction mode set, and abandon the inter-frame subsegmentation prediction mode, step 3, the judgment of intra-frame prediction mode;

step 3.1, calculate ABE (Average Boundary Error) and SBE (Summation Boundary Error) of current code macroblock, ABE reflects macroblock time coherence, ABE=SBE/64

$$SBE = \sum_{i=0}^{15} |Y_{orig}(x+i, y) - Y_{rec}(x+i, y-1)| + \sum_{i=0}^{15} |Y_{orig}(x, y+i) - Y_{rec}(x-1, y+i)|$$

where $Y_{orig}$ represents pixel value of current macroblock, $Y_{rec}$ represents pixel value of rebuild macroblock, (x, y) represents position coordinates of current macroblock, step 3.2, calculate AR (Average Rate) of current macroblock, AR reflects macroblock space coherence, AR=λ Rate/384

λ represents lagrange gene, Rate represents bit number needed by macroblock, step 3.3, compare ABE and AR of macroblock, if ABE<C·AR (C=0.95), it indicates that space redundancy is lower than time redundancy, stop traverse calculation of intra-frame prediction modes, skip to step 4, otherwise, keep traverse calculation of intra-frame prediction modes, and enter step 4;

step 4, based on rate-distortion rule, calculate and choose best inter-frame prediction mode, complete inter-frame prediction coding.

4. The visual perception characteristics-combining hierarchical video coding method according to claim 1, wherein the motion estimation search algorithm comprises, step 1, description of macroblock motion characteristics, step 1.1, based on rate-distortion rule, calculate motion estimation rate-distortion cost value RD cost$_{motion}$ of current macroblock, $J_{motion}(mv,\text{ref}|\lambda_{motion})=SAD[s,r(\text{ref},mv)]+\lambda_{motion}[R(mv-\text{pred})+R(\text{ref})]$ where s represents current pixel value of current macroblock, mv represents macroblock motion vector, pred represents prediction vector, ref represents selected reference frame, r(ref,mv) represents pixel value of current reference macroblock, R represents consuming bit number when motion vector is doing differential encoding, including coding bit number which is the difference between motion vector and its' prediction value and reference coding bit number, $\lambda_{motion}$ represents lagrange multipliers SAD represents sum of absolute differences between current block and reference block which is defined as:

$$SAD(s, c(m)) = \sum_{x=1,y=1}^{M,N} |s[x, y] - c[x - m_x, y - m_y]|$$

M,N represents width and height of current macroblock, x, y represents macroblock position, s represents real value, c represents predictive value, $m=(m_x, m_y)^T$ represents macroblock motion vector, $m_x$ and $m_y$ represents macroblock motion vector in horizontal and vertical directions, step 1.2, based on rate-distortion rule, calculate rate-distortion cost value RD cost$_{mode}$ in mode scheme, $J_{mode}(s,c, \text{mod } e|\lambda_{mode})=SSD(s,c, \text{mod } e|QP)+\lambda_{mode}\times R(s,c,\text{mod } e|QP)$ where mode represents inter-frame coding scheme of current macroblock, s represents origin video signals, c represents rebuild video signals after mode coding, $\lambda_{mode}$ an represents lagrange multipliers, R(s,c,mode|QP) represents sum of binary number including macroblock head information, motion vector and all DCT block information related to scheme and quantization parameter, QP represents coding quantization step, SSD(s, c, mode) represents sum of difference of two squares between origin signals and rebuild signals, $$SSD(s, c, \text{mode}|QP) = \sum_{i=1,j=1}^{B,B_2} (s_Y[x, y] - c_Y[x, y, \text{mode}|QP])^2 + \sum_{i=1,j=1}^{B,B_2} (s_U[x, y] - c_U[x, y, \text{mode}|QP])^2 + \sum_{i=1,j=1}^{B,B_2} (s_V[x, y] - c_V[x, y, \text{mode}|QP])^2$$

where $B_1$ and $B_2$ represent pixel number in horizontal and vertical direction of coding block, respectively, it is one of 16, 8, 4; $s_Y[x, y]$, $c_Y[x, y, \text{mode}|QP]$ represent value of brightness signals between origin video and rebuild video, $c_U$, $c_V$ and $s_U$, $s_V$ represent corresponding value of color difference signals, step 1.3, select minimum rate-distortion cost value RD_min cos t from RD cost$_{motion}$ and RD cost$_{mode}$;

step 2, judgment of severe degree of macroblock motion, calculation formula for the judgment of severe degree of macroblock motion is expressed as:

$$\begin{cases} \text{RD\_mincos}t < (1+\gamma)\times \text{pred\_mincos}t & \text{low motion degree} \\ (1+\gamma)\times\text{pred\_mincos}t < \text{RD\_mincos}t < (1+\delta)\times\text{pred\_mincos}t & \text{medium motion degree} \\ \text{RD\_mincos}t > (1+\delta)\times\text{pred\_mincos}t & \text{high motion degree} \end{cases}$$

where γ,δ represent tuning factor of macroblock motion degree, defined as:

$$\gamma = \frac{Bsize[\text{blocktype}]}{\text{pred\_mincos}t^2} - \alpha_1[\text{blocktype}],$$

-continued $$\delta = \frac{Bsize[blocktype]}{pred\_mincost^2} - \alpha_2[blocktype]$$

where Bsize[blocktype] represents size of current macroblock, which is one of 16×16, 16×8, 8×16, 8×8, 8×4, 4×8, 4×4; pred_min cos t is determined by motion vector prediction mode which is chosen by origin search point of UMHexagonS algorithm,
  (1) if origin search point uses time prediction motion vector, pred_min cos t chooses reference frame motion vector;
  (2) if origin search point does not use time prediction motion vector, then:
  (2.1) if current motion estimation macroblock inter-frame prediction mode is one of large size inter-frame prediction mode 16×16, 16×8, or 8×16, pred_ min cos t chooses median prediction motion vector;
  (2.2) if current motion estimation macroblock inter-frame prediction mode is one of small size inter-frame prediction mode 8×8, 8×4, 4×8, or 4×4, pred_min cos t chooses upper layer prediction motion vector,
based on experimental data, define array $\alpha_1$[blocktype] and array $\alpha_2$[blocktype] respectively:

$\alpha_1$[blocktype]=[−0.23, −0.23, −0.23, −0.25, −0.27, −0.27, −0.28]

$\alpha_2$[blocktype]=[−20.39, −2.40, −2.40, −2.41, −2.45, −2.45, −2.48]

step 3, determine macroblock motion and estimate search hierarchical,
step 3.1 when macroblock motion degree is low, doing performing hexagonal lattice grid search from layer1 to layer3 in step of non-uniform 4 layers of hexagonal lattice grid search of the UMHexagonS algorithm,
step 3.2 when macroblock motion degree is medium, performing hexagonal lattice grid search from layer1 to layer3 in step of non-uniform 4 layers of hexagonal lattice grid search of the UMHexagonS algorithm,
step 3.3: when macroblock motion degree is high, performing 4 layers hexagonal lattice grid search in step of non-uniform 4 layers of hexagonal lattice grid search of the UMHexagonS algorithm.

5. A visual perception characteristics-combining hierarchical video coding method comprising:
  setting priority of visual interest area and setting allocation scheme of video coding resource; wherein:
  the setting priority of visual interest area mainly is: calculation formula for labeling visual characteristic saliency area is expressed as:

$$ROI(x, y) = \begin{cases} 3, & ((T(x, y, MV) = 2 \, or \, T(x, y, MV) = 1) \, \| \\ & S(x, y, Mode) = 1)) \, or \, S(x, y, Mode) = 2 \\ 2, & (T(x, y, MV) = 2 \, or \, T(x, y, MV) = 1) \, \| \, S(x, y, Mode) = 0 \\ 1, & T(x, y, MV) = 0 \, \| \, S(x, y, Mode) = 1 \\ 0, & T(x, y, MV) = 0) \, \| \, (S(x, y, Mode) = 0 \end{cases}$$

where ROI(x, y) represents visual interest priority of current coding macroblock, T(x, y,MV) represents time visual characteristic saliency of current coding macroblock, S(x, y, Mode) represents space visual characteristic saliency of current coding macroblock, (x, y) represents coordinate of current coding macroblock, the setting allocation scheme of video coding resource comprises optimization of macroblock coding of the visual interest area so as to improve real-time performance of video coding;
using fast intra-frame prediction algorithm and gray scaly histogram of macroblock to describe a flat level of macroblock and according to the flat level of macroblock to select possible set of intra-frame prediction modes;
using fast inter-frame prediction algorithm, through analyzing statistical characteristics of probability of occurrence of inter-frame prediction modes, to prejudge specific inter-frame prediction modes so that unnecessary inter-frame prediction mode search and calculation of RD cost can be stopped in advance;
using motion estimation search algorithm, based on relevance of macroblock motion vector, according to coding block movement, to identify search level, realizing high efficient search;
wherein the fast inter-frame prediction algorithm comprises:
step 1, pre judging of skip mode;
step 1.1, calculate rate-distortion cost value $J_{skip}$ of skip mode, if it is lower than a threshold value T, stop searching for other modes, choose skip as best prediction mode, then skip to step 4, otherwise, pass to step 1.2,
where: T=(0.7−Min_cos t/18000)×Min_cos t, Min_cos t represents best rate-distortion cost value of pervious code macroblock;
step 1.2, calculate rate-distortion cost value $J_{16\times16}$ of Inter16×16 mode, if $J_{16\times16}>J_{skip}$, choose skip as best coding mode, then skip to step 4, otherwise pass to step 2;
step 2, the judgment of inter-frame prediction mode of macroblock/sub-block;
step 2.1, calculate rate-distortion cost value $J_{16\times16}$ and $J_{8\times8}$, of Inter16×16 mode and Inter8×8 mode, if $J_{8\times8}-J_{16\times16}>T_0$, choose Inter16×16 mode as best inter-frame coding mode, skip to step 4, otherwise pass to step 2.2,
where $T_0$=0.2×Min_cos t, which is an empirical threshold value obtained from experiment data, Min_cos t represents best rate-distortion cost value of pervious code macroblock;
step 2.2, calculate rate-distortion cost value $J_{4\times4}$ of Inter4×4 mode, if $J_{4\times4}<\min(J_{16\times16}, J_{8\times8})$, take inter-frame subsegmentation prediction mode Inter8×8, Inter8×4, Inter4×8 and Inter4×4 as alternative inter-frame prediction mode set,
otherwise, take macroblock level inter-frame prediction mode Inter16×16, Inter16×8, Inter8×16 as alternative inter-frame prediction mode set, and abandon the inter-frame subsegmentation prediction mode,
step 3, the judgment of intra-frame prediction mode;
step 3.1, calculate ABE (Average Boundary Error) and SBE (Summation Boundary Error) of current code macroblock, ABE reflects macroblock time coherence, ABE=SBE/64

$$SBE = \sum_{i=0}^{15} |Y_{orig}(x+i, y) - Y_{rec}(x+i, y-1)| + \sum_{i=0}^{15} |Y_{orig}(x, y+i) - Y_{rec}(x-1, y+i)|$$

where $Y_{orig}$ represents pixel value of current macroblock, $Y_{rec}$ represents pixel value of rebuild macroblock, (x, y) represents position coordinates of current macroblock, step 3.2, calculate AR (Average Rate) of current macroblock, AR reflects macroblock space coherence, $$AR = \lambda \, Rate/384$$

$\lambda$ represents lagrange gene, Rate represents bit number needed by macroblock, step 3.3, compare ABE and AR of macroblock, if ABE<C·AR (C=0.95), it indicates that space redundancy is lower than time redundancy, stop traverse calculation of intra-frame prediction modes, skip to step 4, otherwise, keep traverse calculation of intra-frame prediction modes, and enter step 4;

step 4, based on rate-distortion rule, calculate and choose best inter-frame prediction mode, complete inter-frame prediction coding.

6. The visual perception characteristics-combining hierarchical video coding method according to claim 5, wherein the setting priority of visual interest area comprises:

labeling time visual characteristic saliency area, which includes step 1 and step 2, step 1 being motion vector noise detection and step 2 being translation motion vector detection, the motion vector noise detection and the translation motion vector detection are used for reduction of the influence to accuracy of time visual saliency area measurement due to motion vector noise and translation motion vector generated by camera motion respectively, and to perform separation between foreground and background, labeling space visual characteristic saliency area, and labeling, according to labeling results of the time visual characteristic saliency area and the space visual characteristic saliency area, the visual characteristic saliency area.

7. The visual perception characteristics-combining hierarchical video coding method according to claim 6, wherein: when labeling the time visual characteristic saliency area, calculation formula for the motion vector noise detection in step 1 is expressed as:

$$T_1(x, y, MV) = \begin{cases} 3, & \text{if } |\overline{V_{rr}}| = 0 \\ 2, & \text{elseif } |\vec{V}_s| \geq |\overline{V_{rr}}| \\ T_2(x, y, MV) & \text{esle} \end{cases} \quad (1)$$

where (x, y) in (1) represents position coordinates, $\vec{V}_s$ represents motion vector of current macroblock, $\overline{V}_{rr}$ is average vector of motion reference area $C_{rr}$, defined as:

$$\overline{V}_{rr} = \frac{\sum_{\in C_{rr}} \vec{v}_{rr}}{num_{C_{rr}}}$$

$\vec{v}_{rr}$ represents macroblock motion vector in $C_{rr}$, $num_{C_{rr}}$ represents accumulation times $C_{rr}$ is defined so that shape, position and area of reference area $C_{rr}$ can be adaptively adjusted with the change of motion vector $\vec{V}_s$ four macroblocks located in upper right, upper left, lower right and lower left of $C_{rr}$ are $MB_1$, $MB_2$, $MB_3$ $MB_4$, position coordinates of $MB_1$, $MB_2$, $MB_3$, $MB_4$ are defined as:

$$MB_k(x_k, y_k)_{k=1,2,3,4} = \begin{cases} MB_1(x - j_c, y - i_c) \\ MB_2(x - j_c, y + i_c) \\ MB_3(x + j_c, y - i_c) \\ MB_4(x + j_c, y + i_c) \end{cases}$$

where $i_c = \left[\frac{|\vec{V}_{sx}|}{w_s} + 1\right]$, $j_c = \left[\frac{|\vec{V}_{sy}|}{h_s} + 1\right]$, $|\vec{V}_{sx}|$, and $|\vec{V}_{sy}|$ are motion amplitude of current motion vector $\vec{V}_s$ in horizontal and vertical, $w_s$ and $h_s$ represent width and height of current code block, respectively, [·] represents integer calculation, if $|\overline{V}_{rr}| = 0$, it indicates that there is no motion vector in $C_{rr}$, so that $\vec{V}_s$ is caused by motion noise and thus is removed, and $\vec{V}_s$ is set as 0, and labeled as $T_1(x, y, MV) = 3$, if $|\vec{V}_s| \geq |\overline{V}_{rr}|$, it indicates that current code block has higher motion characteristic saliency than adjacent macroblocks, which belongs to foreground dynamic area, and labeled as $T_1(x, y, MV) = 2$, otherwise, current code block has substantially the same motion characteristic saliency as adjacent macroblocks, then translation motion vector detection is performed to confirm whether the current code block belongs to background area or foreground translation area, which is labeled as $T_2(x, y, MV)$, calculation formula of translation motion vector detection of step 2 is:

$$T_2(x, y, MV) = \begin{cases} 1, & \text{if } SAD_{(x,y)} \geq \overline{S}_c \\ 0, & \text{else} \end{cases} \quad (2)$$

where (x,y) represents position coordinates of current code block, $\overline{S}_c$ represents dynamic threshold, $SAD_{(x,y)}$ represents sum of absolute differences between current code block and corresponding station block in previous frame, used to characterize the change between two adjacent corresponding code blocks, defined as:

$$SAD_{(x,y)} = \sum_{i=1}^{M} \sum_{j=1}^{N} |s(i, j) - c(i, j)|$$

where s(i, j) represents pixel value of current code block, c(i, j) represents corresponding pixel value in pervious frame, M · N represents length and wide of current code block respectively, $\overline{S}_c$ represents average value of SAD of all code blocks in background area of pervious frame, defined as:

$$\overline{S}_c = \frac{\sum_{x,y \in S_c} SAD_{(x,y)}}{Num}$$

$S_c$ represents background area of pervious frame, $$\sum_{x,y \in S_c} SAD_{(x,y)} \quad (5)$$

represents the sum of SAD value of current code blocks in $S_c$, Num represents accumulation times, formula for labeling the time visual characteristic saliency area is expressed as:

$$T(x, y, MV) = \begin{cases} 3, & if \ |\overline{V_{rr}}| = 0 \\ 2, & elseif \ |\overline{V_s}| \geq |\overline{V_{rr}}| \\ 1, & elseif \ SAD_{(x,y)} \geq \overline{S_c} \\ 0, & else \end{cases} \quad (3)$$

where parameters of (3) are same with (1) and (2)

then, performing labeling of the space visual characteristic saliency area, calculation formula is expressed as:

$$S(x, y, Mode) = \begin{cases} 2, & Mode_P \in \{Intra\} \\ 1, & Mode_P \in \{Inter8\} \text{ or } Mode_I \in Intra4 \times 4 \\ 0, & Mode_P \in \{Inter16\} \text{ or } Mode_I \in Intra16 \times 16 \end{cases} \quad (4)$$

where (x, y) represents position coordinates of current code block, Mode represents prediction mode of current code block, mode represents prediction mode of current code block in P frame of code, $mode_I$ represents prediction mode of current code block in I frame of code, if $mode_P$ chooses intra-frame prediction mode, it indicates that space visual characteristic saliency is the highest, which belongs to sensitive area, and is labeled as S(x, y, Mode)=2;

if $mode_P$ chooses a set of sub-block prediction modes, Inter8(8×8, 8×4, 4×8, 4×4) or Intra4×4 prediction mode, it indicates that spatial detail is rich, and the space visual characteristic saliency is high, which belongs to interest area, and is labeled as: S(x, y, Mode)=1;

if $mode_P$ chooses a set of inter-frame prediction modes, Inter16(Skip, 16×16, 16×8, 8×16) or $mode_I$ chooses Intra16×16 prediction mode, it indicates that spatial change is flat, and the space visual characteristic saliency is low, which belongs to non-obvious area, and labeled as S(x, y, Mode)=0;

labeling, according to labeling results of the space visual characteristic saliency area and the time visual characteristic saliency area, the visual characteristic saliency area.

8. The visual perception characteristics-combining hierarchical video coding method according to claim 5, wherein the fast intra-frame prediction algorithm comprises:

step 1, calculate gray histogram of brightness component Y of current macroblock, and record maximum pixels thereof, Max Value;

step 2, set upper threshold $Th_{high}$ and lower threshold $Th_{low}$, wherein $Th_{high}$ and $Th_{low}$ are integer in a range from 1 to 256;

step 3, if Max Value≥$Th_{high}$, it indicates that macroblock is flat, then abandon Intra4×4 prediction modes, choose Intra16×16 prediction modes, take a prediction mode with minimum rate-distortion cost as best intra-frame prediction mode, and update the upper threshold to $$Th_{high-new} : Th_{high-new} = \frac{Th_{high} + MaxValue}{2},$$

otherwise, pass to step 4;

step 4, if Max Value≤$Th_{low}$, it indicates that macroblock is rich in details, then abandon Intra16×16 prediction mode, choose Intra4×4 prediction mode, take a prediction mode with minimum rate-distortion cost as best intra-frame prediction mode, and update the lower threshold-to $Th_{low-new}$:

$$Th_{low-new} = \frac{Th_{low} + MaxValue}{2},$$

otherwise, pass to step 5;

step 5, if $Th_{low}$<Max Value<$Th_{high}$, it indicates that flatness of macroblock is not obvious, then using standard frame prediction algorithm.

9. The visual perception characteristics-combining hierarchical video coding method according to claim 5, wherein the motion estimation search algorithm comprises, step 1, description of macroblock motion characteristics, step 1.1, based on rate-distortion rule, calculate motion estimation rate-distortion cost value RD $cost_{motion}$ of current macroblock, $$J_{motion}(mv, ref|\lambda_{motion}) = SAD[s, r(ref, mv)] + \lambda_{motion} [R(mv - pred) + R(ref)]$$

where s represents current pixel value of current macroblock, mv represents macroblock motion vector, pred represents prediction vector, ref represents selected reference frame, r(ref,mv) represents pixel value of current reference macroblock, R represents consuming bit number when motion vector is doing differential encoding, including coding bit number which is the difference between motion vector and its' prediction value and reference coding bit number, $\lambda_{motion}$ represents lagrange multipliers SAD represents sum of absolute differences between current block and reference block which is defined as:

$$SAD(s, c(m)) = \sum_{x=1, y=1}^{M,N} |s[x, y] - c[x - m_x, y - m_y]|$$

M,N represents width and height of current macroblock, x, y represents macroblock position, s represents real value, c represents predictive value, $m = (m_x, m_y)^T$ represents macroblock motion vector, $m_x$ and $m_y$ represents macroblock motion vector in horizontal and vertical directions, step 1.2, based on rate-distortion rule, calculate rate-distortion cost value RD $cost_{mode}$ in mode scheme, $$J_{mode}(s, c, mod \ e|\lambda_{mode}) = SSD(s, c, mod \ e|QP) + \lambda_{mode} \times R(s, c, mod \ e|QP)$$

where mode represents inter-frame coding mode of current macroblock, s represents origin video signals, c represents rebuild video signals after mode coding, $\lambda_{mode}$ represents lagrange multipliers, R(s,c, mode|QP)

represents sum of binary number including macroblock head information, motion vector and all DCT block information related to scheme and quantization parameter, QP represents coding quantization step, SSD(s, c, mode) represents sum of difference of two squares between origin signals and rebuild signals, $$SSD(s, c, \mod e \mid QP) = \sum_{i=1,j=1}^{B,B_2} (s_Y[x, y] - c_Y[x, y, \mod e \mid QP])^2 +$$
$$\sum_{i=1,j=1}^{B,B_2} (s_U[x, y] - c_U[x, y, \mod e \mid QP])^2 +$$
$$\sum_{i=1,j=1}^{B,B_2} (s_V[x, y] - c_V[x, y, \mod e \mid QP])^2$$

where $B_1$ and $B_2$ represent pixel number in horizontal and vertical direction of coding block, respectively, it is one of 16·8·4; $s_Y[x, y] \cdot c_Y[x, y, mode|QP]$ represent value of brightness signals between origin video and rebuild video, $c_U$, $c_V$ and $s_U$, $s_V$ represent corresponding value of color difference signals, step 1.3, select minimum rate-distortion cost value RD_min cos t from RD cost$_{motion}$ and RD cost$_{mode}$;

step 2, judgment of severe degree of macroblock motion, calculation formula for the judgment of severe degree of macroblock motion is expressed as:

$$\begin{cases} RD\_min \cos t < (1 + \gamma) \times pred\_min \cos t & \text{low motion degree} \\ (1 + \gamma) \times pred\_min \cos t < RD\_min \cos t < & \text{medium motion} \\ \quad (1 + \delta) \times pred\_min \cos t & \text{degree} \\ RD\_min \cos t > (1 + \delta) \times pred\_min \cos t & \text{high motion degree} \end{cases}$$

where $\gamma, \delta$ represent tuning factor of macroblock motion degree, defined as:

$$\gamma = \frac{Bsize[blocktype]}{pred\_min \cos t^2} - \alpha_1[blocktype],$$
$$\delta = \frac{Bsize[blocktype]}{pred\_min \cos t^2} - \alpha_2[blocktype]$$

where Bsize[blocktype] represents size of current macroblock, which is one of 16×16, 16×8, 8×16, 8×8, 8×4, 4×8, 4×4; pred_min cos t is determined by motion vector prediction mode which is chosen by origin search point of UMHexagonS algorithm, (1) if origin search point uses time prediction motion vector, pred_min cos t chooses reference frame motion vector;

(2) if origin search point does not use time prediction motion vector, then:

(2.1) if current motion estimation macroblock inter-frame prediction mode is one of large size inter-frame prediction mode 16×16, 16×8, or 8×16, pred_min cos t chooses median prediction motion vector;

(2.2) if current motion estimation macroblock inter-frame prediction mode is one of small size inter-frame prediction mode 8×8, 8×4, 4×8, or 4×4, pred_min cos t chooses upper layer prediction motion vector, based on experimental data, define array $\alpha_1$[blocktype] and array $\alpha_2$[blocktype] respectively:

$\alpha_1$[blocktype]=[−0.23, −0.23, −0.23, −0.25, −0.27, −0.27, −0.28]

$\alpha_2$[blocktype]=[−2.39, −2.40, −2.40, −2.41, −2.45, −2.45, −2.48]

step 3, determine macroblock motion and estimate search hierarchical, step 3.1 when macroblock motion degree is low, performing hexagonal lattice grid search from layer1 to layer3 in step of non-uniform 4 layers of hexagonal lattice grid search of the UMHexagonS algorithm, step 3.2 when macroblock motion degree is medium, performing hexagonal lattice grid search from layer1 to layer3 in step of non-uniform 4 layers of hexagonal lattice grid search of the UMHexagonS algorithm, step 3.3: when macroblock motion degree is high, performing 4 layers hexagonal lattice grid search in step of non-uniform 4 layers of hexagonal lattice grid search of the UMHexagonS algorithm.

10. A visual perception characteristics-combining hierarchical video coding method comprising:

setting priority of visual interest area and setting allocation scheme of video coding resource; wherein:

the setting priority of visual interest area mainly is: calculation formula for labeling visual characteristic saliency area is expressed as:

$$ROI(x, y) = \begin{cases} 3, & ((T(x, y, MV) = 2 \,or\, T(x, y, MV) = 1) \,\|\, \\ & S(x, y, \text{Mode}) = 1)) \,or\, S(x, y, \text{Mode}) = 2 \\ 2, & (T(x, y, MV) = 2 \,or\, T(x, y, MV) = 1 \,\|\, \\ & S(x, y, \text{Mode}) = 0 \\ 1, & T(x, y, MV) = 0 \,\|\, S(x, y, \text{Mode}) = 1 \\ 0, & T(x, y, MV) = 0) \,\|\, (S(x, y, \text{Mode}) = 0 \end{cases}$$

where ROI(x, y) represents visual interest priority of current coding macroblock, T(x, y,MV) represents time visual characteristic saliency of current coding macroblock, S(x, y, Mode) represents space visual characteristic saliency of current coding macroblock, (x, y) represents coordinate of current coding macroblock, the setting allocation scheme of video coding resource comprises optimization of macroblock coding of the visual interest area so as to improve real-time performance of video coding;

using fast intra-frame prediction algorithm and gray scaly histogram of macroblock to describe a flat level of macroblock and according to the flat level of macroblock to select possible set of intra-frame prediction modes;

using fast inter-frame prediction algorithm, through analyzing statistical characteristics of probability of occurrence of inter-frame prediction modes, to prejudge specific inter-frame prediction modes so that unnecessary inter-frame prediction mode search and calculation of RD cost can be stopped in advance;

using motion estimation search algorithm, based on relevance of macroblock motion vector, according to coding block movement, to identify search level, realizing high efficient search;

wherein the motion estimation search algorithm comprises, step 1, description of macroblock motion characteristics,
step 1.1, based on rate-distortion rule, calculate motion estimation rate-distortion cost value RD $cost_{motion}$ of current macroblock, $$J_{motion}(mv, ref|\lambda_{motion}) = SAD[s, r(ref, mv)] + \lambda_{motion}[R(mv - pred) + R(ref)]$$

where s represents current pixel value of current macroblock, mv represents macroblock motion vector, pred represents prediction vector, ref represents selected reference frame, r(ref,mv) represents pixel value of current reference macroblock, R represents consuming bit number when motion vector is doing differential encoding, including coding bit number which is the difference between motion vector and its' prediction value and reference coding bit number, $\lambda_{motion}$ represents lagrange multipliers SAD represents sum of absolute differences between current block and reference block which is defined as:

$$SAD(s, c(m)) = \sum_{x=1, y=1}^{M, N} |s[x, y] - c[x - m_x, y - m_y]|$$

M,N represents width and height of current macroblock, x,y represents macroblock position, s represents real value, c represents predictive value, $m=(m_x, m_y)^T$ represents macroblock motion vector, $m_x$ and $m_y$ represents macroblock motion vector in horizontal and vertical directions, step 1.2, based on rate-distortion rule, calculate rate-distortion cost value RD $cost_{mode}$ in mode scheme, $$J_{mode}(s, c, mod\ e|\lambda_{mode}) = SSD(s, c, mod\ e|QP) + \lambda_{mode} \times R(s, c, mod\ e|QP)$$

where mode represents inter-frame coding mode of current macroblock, s represents origin video signals, c represents rebuild video signals after mode coding, $\lambda_{mode}$ represents lagrange multipliers, R(s,c, mode|QP) represents sum of binary number including macroblock head information, motion vector and all DCT block information related to scheme and quantization parameter, QP represents coding quantization step, SSD(s,c, mode) represents sum of difference of two squares between origin signals and rebuild signals, $$SSD(s, c, mod\ e | QP) = \sum_{i=1, j=1}^{B, B_2} (s_Y[x, y] - c_Y[x, y, mod\ e | QP])^2 + \sum_{i=1, j=1}^{B, B_2} (s_U[x, y] - c_U[x, y, mod\ e | QP])^2 + \sum_{i=1, j=1}^{B, B_2} (s_V[x, y] - c_V[x, y, mod\ e | QP])^2$$

where $B_1$ and $B_2$ represent pixel number in horizontal and vertical direction of coding block, respectively, it is one of 16, 8, 4; $s_Y[x, y]$, $c_Y[x, y, mode|QP]$ represent value of brightness signals between origin video and rebuild video, $c_U$, $c_V$ and $s_U$, $s_V$ represent corresponding value of color difference signals, step 1.3, select minimum rate-distortion cost value RD_min cos t from RD $cost_{motion}$ and RD $cost_{mode}$;
step 2, judgment of severe degree of macroblock motion, calculation formula for the judgment of severe degree of macroblock motion is expressed as:

$$\begin{cases} RD\_min \cos t < (1 + \gamma) \times pred\_min \cos t & \text{low motion degree} \\ (1 + \gamma) \times pred\_min \cos t < RD\_min \cos t < & \text{medium motion} \\ (1 + \delta) \times pred\_min \cos t & \text{degree} \\ RD\_min \cos t > (1 + \delta) \times pred\_min \cos t & \text{high motion degree} \end{cases}$$

where $\gamma, \delta$ represent tuning factor of macroblock motion degree, defined as:

$$\gamma = \frac{Bsize[blocktype]}{pred\_min cost^2} - \alpha_1[blocktype],$$

$$\delta = \frac{Bsize[blocktype]}{pred\_min cost^2} - \alpha_2[blocktype]$$

where Bsize[blocktype] represents size of current macroblock, which is one of 16×16, 16×8, 8×16, 8×8, 8×4, 4×8, 4×4; pred_min cos t is determined by motion vector prediction mode which is chosen by origin search point of UMHexagonS algorithm,
(1) if origin search point uses time prediction motion vector, pred_min cos t chooses reference frame motion vector;
(2) if origin search point does not use time prediction motion vector, then:
(2.1) if current motion estimation macroblock inter-frame prediction mode is one of large size inter-frame prediction mode 16×16, 16×8, or 8×16, pred_min cos t chooses median prediction motion vector;
(2.2) if current motion estimation macroblock inter-frame prediction mode is one of small size inter-frame prediction mode 8×8, 8×4, 4×8, or 4×4, pred_min cos t chooses upper layer prediction motion vector,
based on experimental data, define array $\alpha_1$[blocktype] and array $\alpha_2$[blocktype] respectively:

$\alpha_1$[blocktype]=[−0.23, −0.23, −0.23, −0.25, −0.27, −0.27, −0.28]

$\alpha_2$[blocktype]=[−2.39, −2.40, −2.40, −2.41, −2.45, −2.45, −2.48]

step 3, determine macroblock motion and estimate search hierarchical,
step 3.1 when macroblock motion degree is low, performing hexagonal lattice grid search from layer1 to layer3 in step of non-uniform 4 layers of hexagonal lattice grid search of the UMHexagonS algorithm,
step 3.2 when macroblock motion degree is medium, performing hexagonal lattice grid search from layer1 to layer3 in step of non-uniform 4 layers of hexagonal lattice grid search of the UMHexagonS algorithm,
step 3.3: when macroblock motion degree is high, performing 4 layers hexagonal lattice grid search in step of non-uniform 4 layers of hexagonal lattice grid search of the UMHexagonS algorithm.

11. The visual perception characteristics-combining hierarchical video coding method according to claim 10, wherein the setting priority of visual interest area comprises:
labeling time visual characteristic saliency area, which includes step 1 and step 2, step 1 being motion vector noise detection and step 2 being translation motion vector detection, the motion vector noise detection and the translation motion vector detection are used for reduction of the influence to accuracy of time visual saliency area measurement due to motion vector noise and translation motion vector generated by camera motion respectively, and to perform separation between foreground and background, labeling space visual characteristic saliency area, and labeling, according to labeling results of the time visual characteristic saliency area and the space visual characteristic saliency area, the visual characteristic saliency area.

12. The visual perception characteristics-combining hierarchical video coding method according to claim 11, wherein: when labeling the time visual characteristic saliency area, calculation formula for the motion vector noise detection in step 1 is expressed as:

$$T_1(x, y, MV) = \begin{cases} 3, & \text{if } |\overline{V_{rr}}| = 0 \\ 2, & \text{elseif } |\vec{V}_s| \geq |\overline{V_{rr}}| \\ T_2(x, y, MV) & \text{esle} \end{cases} \quad (1)$$

where (x, y) in (1) represents position coordinates, $\vec{V}_s$ represents motion vector of current macroblock, $\overline{V}_{rr}$ is average vector of motion reference area $C_{rr}$, defined as:

$$\overline{V}_{rr} = \frac{\sum_{\in C_{rr}} \vec{v}_{rr}}{num_{C_{rr}}}$$

$\vec{v}_{rr}$ represents macroblock motion vector in $C_{rr}$, $num_{C_{rr}}$ represents accumulation times $C_{rr}$ is defined so that shape, position and area of reference area $C_{rr}$ can be adaptively adjusted with the change of motion vector $\vec{V}_s$ four macroblocks located in upper right, upper left, lower right and lower left of $C_{rr}$ are $MB_1$, $MB_2$, $MB_3$, $MB_4$, position coordinates of $MB_1$, $MB_2$, $MB_3$, $MB_4$ are defined as:

$$MB_k(x_k, y_k)_{k=1,2,3,4} = \begin{cases} MB_1(x - j_c, y - i_c) \\ MB_2(x - j_c, y + i_c) \\ MB_3(x + j_c, y - i_c) \\ MB_4(x + j_c, y + i_c) \end{cases}$$

where $i_c = \left[\frac{|\vec{V}_{sx}|}{w_s} + 1\right]$, $j_c = \left[\frac{|\vec{V}_{sy}|}{h_s} + 1\right]$, $|\vec{V}_{sx}|$, and $|\vec{V}_{sy}|$, are motion amplitude of current motion vector $\vec{V}_s$ in horizontal and vertical, $w_s$ and $h_s$ represent width and height of current code block, respectively, [•] represents integer calculation, if $|\overline{V}_{rr}|=0$, it indicates that there is no motion vector in $C_{rr}$, so that $\vec{V}_s$ is caused by motion noise and thus is removed, and $\vec{V}_s$ is set as 0, and labeled as $T_1(x, y, MV)=3$, if $|\vec{V}_s| \geq |\overline{V}_{rr}|$, it indicates that current code block has higher motion characteristic saliency than adjacent macroblocks, which belongs to foreground dynamic area, and labeled as $T_1(x, y, MV)=2$, otherwise, current code block has substantially the same motion characteristic saliency as adjacent macroblocks, then translation motion vector detection is performed to confirm whether the current code block belongs to background area or foreground translation area, which is labeled as $T_2$ (x, y, MV), calculation formula of translation motion vector detection of step 2 is:

$$T_2(x, y, MV) = \begin{cases} 1, & \text{if } SAD_{(x,y)} \geq \overline{S}_c \\ 0, & \text{else} \end{cases} \quad (2)$$

where (x,y) represents position coordinates of current code block, $\overline{S}_c$ represents dynamic threshold, $SAD_{(x,y)}$ represents sum of absolute differences between current code block and corresponding station block in previous frame, used to characterize the change between two adjacent corresponding code blocks, defined as:

$$SAD_{(x,y)} = \sum_{i=1}^{M} \sum_{j=1}^{N} |s(i, j) - c(i, j)|$$

where s(i, j) represents pixel value of current code block, c(i, j) represents corresponding pixel value in pervious frame, M N represents length and wide of current code block respectively, $\overline{S}_c$ represents average value of SAD of all code blocks in background area of pervious frame, defined as:

$$\overline{S}_c = \frac{\sum_{x,y \in S_c} SAD_{(x,y)}}{Num}$$

$S_c$ represents background area of pervious frame, $$\sum_{x,y \in S_c} SAD_{(x,y)}$$

represents the sum of SAD value of current code blocks in $S_c$, Num represents accumulation times, formula for labeling the time visual characteristic saliency area is expressed as:

$$T(x, y, MV) = \begin{cases} 3, & \text{if } |\overline{V_{rr}}| = 0 \\ 2, & \text{elseif } |\vec{V}_s| \geq |\overline{V_{rr}}| \\ 1, & \text{elseif } SAD_{(x,y)} \geq \overline{S}_c \\ 0, & \text{else} \end{cases} \quad (3)$$

where parameters of (3) are same with (1) and (2)

then, performing labeling of the space visual characteristic saliency area, calculation formula is expressed as:

$$S(x, y, Mode) = \begin{cases} 2, & Mode_P \in \{Intra\} \\ 1, & Mode_P \in \{Inter8\} \text{ or } Mode_I \in Intra4 \times 4 \\ 0, & Mode_P \in \{Inter16\} \text{ or } Mode_I \in Intra16 \times 16 \end{cases} \quad (4)$$

where (x, y) represents position coordinates of current code block, Mode represents prediction mode of current code block, $mode_P$ represents prediction mode of current code block in P frame of code, $mode_I$ represents prediction mode of current code block in I frame of code, if $mode_P$ chooses intra-frame prediction mode, it indicates that space visual characteristic saliency is the highest, which belongs to sensitive area, and is labeled as S(x, y, Mode)=2;

if $mode_P$ chooses a set of sub-block prediction modes, Inter8(8×8, 8×4, 4×8, 4×4) or Intra4×4 prediction mode, it indicates that spatial detail is rich, and the space visual characteristic saliency is high, which belongs to interest area, and is labeled as: S(x, y, Mode)=1;

if $mode_P$ chooses a set of inter-frame prediction modes, Inter16(Skip, 16×16, 16×8, 8×16) or $mode_I$ chooses Intra16×16 prediction mode, it indicates that spatial change is flat, and the space visual characteristic saliency is low, which belongs to non-obvious area, and labeled as S(x, y, Mode)=0;

labeling, according to labeling results of the space visual characteristic saliency area and the time visual characteristic saliency area, the visual characteristic saliency area.

13. The visual perception characteristics-combining hierarchical video coding method according to claim 10, wherein the fast intra-frame prediction algorithm comprises:

step 1, calculate gray histogram of brightness component Y of current macroblock, and record maximum pixels thereof, Max Value;

step 2, set upper threshold $Th_{high}$ and lower threshold $Th_{low}$, wherein $Th_{high}$ and $Th_{low}$ are integer in a range from 1 to 256;

step 3, if Max Value≥$Th_{high}$, it indicates that macroblock is flat, then abandon Intra4×4 prediction modes, choose Intra16×16 prediction modes, take a prediction mode with minimum rate-distortion cost as best intra-frame prediction mode, and update the upper threshold to $Th_{high-new}$: 
$$Th_{high-new} = \frac{Th_{high} + MaxValue}{2},$$

otherwise, pass to step 4;

step 4, if Max Value≤$Th_{low}$, it indicates that macroblock is rich in details, then abandon Intra16×16 prediction mode, choose Intra4×4 prediction mode, take a prediction mode with minimum rate-distortion cost as best intra-frame prediction mode, and update the lower threshold-to $Th_{low-new}$:
$$Th_{low-new} = \frac{Th_{low} + MaxValue}{2},$$

otherwise, pass to step 5;

step 5, if $Th_{low}$<Max Value<$Th_{high}$, it indicates that flatness of macroblock is not obvious, then using standard frame prediction algorithm.

14. The visual perception characteristics-combining hierarchical video coding method according to claim 1, wherein the fast inter frame prediction algorithm comprises:

step 1, pre judging of skip mode;

step 1.1, calculate rate-distortion cost value $J_{skip}$ of skip mode, if it is lower than a threshold value T, stop searching for other modes, choose skip as best prediction mode, then skip to step 4, otherwise, pass to step 1.2, where: T=(0.7−Min_cos t/18000)×Min_cos t, Min_cos t represents best rate-distortion cost value of pervious code macroblock;

step 1.2, calculate rate-distortion cost value $J_{16×16}$ of Inter16×16 mode, if $J_{16×16}$>$J_{skip}$, choose skip as best coding mode, then skip to step 4, otherwise pass to step 2;

step 2, the judgment of inter-frame prediction mode of macroblock/sub-block;

step 2.1, calculate rate-distortion cost value $J_{16×16}$ and $J_{8×8}$, of Inter16×16 mode and Inter8×8 mode, if $J_{8×8}$−$J_{16×16}$>$T_0$, choose Inter16×16 mode as best inter-frame coding mode, skip to step 4, otherwise pass to step 2.2, where $T_0$=0.2×Min_cost, which is an empirical threshold value obtained from experiment data, Min_cos t represents best rate-distortion cost value of pervious code macroblock;

step 2.2, calculate rate-distortion cost value $J_{4×4}$ of Inter4×4 mode, if $J_{4×4}$<min($J_{16×16}$, $J_{8×8}$), take inter-frame subsegmentation prediction mode Inter8×8, Inter8×4, Inter4×8 and Inter4×4 as alternative inter-frame prediction mode set, otherwise, take macroblock level inter-frame prediction mode Inter16×16, Inter16×8, Inter8×16 as alternative inter-frame prediction mode set, and abandon the inter-frame subsegmentation prediction mode, step 3, the judgment of intra-frame prediction mode;

step 3.1, calculate ABE (Average Boundary Error) and SBE (Summation Boundary Error) of current code macroblock, ABE reflects macroblock time coherence, ABE=SBE/64

$$SBE = \sum_{i=0}^{15} |Y_{orig}(x+i, y) - Y_{rec}(x+i, y-1)| + \sum_{i=0}^{15} |Y_{orig}(x, y+i) - Y_{rec}(x-1, y+i)|$$

where $Y_{orig}$ represents pixel value of current macroblock, $Y_{rec}$ represents pixel value of rebuild macroblock, (x, y) represents position coordinates of current macroblock, step 3.2, calculate AR (Average Rate) of current macroblock, AR reflects macroblock space coherence, AR=λ Rate/384

λ represents lagrange gene, Rate represents bit number needed by macroblock, step 3.3, compare ABE and AR of macroblock, if ABE<C·AR (C=0.95), it indicates that space redundancy is lower than time redundancy, stop traverse calculation of intra-frame prediction modes, skip to step 4, otherwise, keep traverse calculation of intra-frame prediction modes, and enter step 4;

step 4, based on rate-distortion rule, calculate and choose best inter-frame prediction mode, complete inter-frame prediction coding.

15. The visual perception characteristics-combining hierarchical video coding method according to claim 2, wherein the upper threshold $Th_{high}$ and lower threshold $Th_{low}$ is set as 150 and 50, respectively.

16. The visual perception characteristics-combining hierarchical video coding method according to claim 8, wherein the upper threshold $Th_{high}$ and lower threshold $Th_{low}$ is set as 150 and 50, respectively.

17. The visual perception characteristics-combining hierarchical video coding method according to claim 13, wherein the upper threshold $Th_{high}$ and lower threshold $Th_{low}$ is set as 150 and 50, respectively.

* * * * *